US010452894B2

(12) United States Patent
Zhang et al.

(10) Patent No.: US 10,452,894 B2
(45) Date of Patent: Oct. 22, 2019

(54) SYSTEMS AND METHOD FOR FACIAL VERIFICATION

(75) Inventors: Xiaopeng Zhang, Richmond Hill (CA); Xiaokang Zhang, Markham (CA); Jilai Wang, Richmond Hill (CA); Xiaoming Zhou, Markham (CA); Gang Qiu, Markham (CA); Liang Shen, Toronto (CA); Chen Feng, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 879 days.

(21) Appl. No.: 13/533,706

(22) Filed: Jun. 26, 2012

(65) Prior Publication Data

US 2013/0342702 A1 Dec. 26, 2013

(51) Int. Cl.
*H04N 5/33* (2006.01)
*G06K 9/00* (2006.01)
*G06K 9/20* (2006.01)

(52) U.S. Cl.
CPC ..... *G06K 9/00255* (2013.01); *G06K 9/00906* (2013.01); *G06K 9/2018* (2013.01)

(58) Field of Classification Search
CPC ............. G06K 9/00255; G06K 9/2018; G06K 9/00906; H04N 5/33; H04N 5/332; G01N 2203/0641; G01N 2223/509
USPC ............................ 348/77, 164; 382/115, 118
See application file for complete search history.

(56) References Cited

U.S. PATENT DOCUMENTS

| 6,424,727 | B1 | 7/2002 | Musgrave et al. |
| 6,820,979 | B1 | 11/2004 | Stark et al. |
| 7,469,160 | B2 | 12/2008 | Banks et al. |
| 7,602,942 | B2 | 10/2009 | Bazakos et al. |
| 7,693,307 | B2 | 4/2010 | Rieul et al. |
| 7,801,339 | B2 | 9/2010 | Sidlauskas et al. |
| 8,165,357 | B2 | 4/2012 | Rowe |
| 8,190,239 | B2 | 5/2012 | Endoh et al. |
| 8,345,936 | B2 | 1/2013 | Burge et al. |
| 8,374,404 | B2 | 2/2013 | Williams et al. |

(Continued)

FOREIGN PATENT DOCUMENTS

| CN | 101404060 A | 4/2009 |
| CN | 101964056 A | 2/2011 |

(Continued)

OTHER PUBLICATIONS

Kanzawa et al., "Human Skin Detection by Visible and Near-Infrared Imaging", Jun. 13-15, 2011, 2011 APR Conference on Machine Vision Applications, p. 505, section 4.1, second to last paragraph.*

(Continued)

*Primary Examiner* — Matthew K Kwan
(74) *Attorney, Agent, or Firm* — QUALCOMM Incorporated

(57) ABSTRACT

Systems and methods for detecting a live human face in an image are disclosed. The methods and systems are capable of receiving multispectral image data that includes a human face. The multispectral image data can comprise visible light image data and near-infrared (NIR) image data. The multispectral image data can be processed to detect the human face. The detected human face in the visible light image data can be associated with the detected human face in the NIR image data to determine whether the detected human face is a live human face.

34 Claims, 13 Drawing Sheets

(56) References Cited

U.S. PATENT DOCUMENTS

| | | | |
|---|---|---|---|
| 8,408,821 | B2 | 4/2013 | Wu et al. |
| 8,411,909 | B1 | 4/2013 | Zhao et al. |
| 8,798,333 | B2 | 8/2014 | Hanna et al. |
| 8,953,849 | B2 | 2/2015 | Hanna |
| 8,965,063 | B2 | 2/2015 | Hanna et al. |
| 8,978,333 | B2 | 3/2015 | Potter et al. |
| 2002/0136435 | A1 | 9/2002 | Prokoski |
| 2003/0053664 | A1* | 3/2003 | Pavlidis et al. ............... 382/117 |
| 2005/0074167 | A1 | 4/2005 | Maeda et al. |
| 2006/0097172 | A1 | 5/2006 | Park |
| 2006/0104488 | A1 | 5/2006 | Bazakos et al. |
| 2006/0210261 | A1 | 9/2006 | Kakiuchi et al. |
| 2007/0248330 | A1* | 10/2007 | Pillman et al. ............... 386/107 |
| 2007/0268485 | A1* | 11/2007 | Polonskiy et al. ............ 356/300 |
| 2007/0297648 | A1 | 12/2007 | Endoh et al. |
| 2008/0192988 | A1 | 8/2008 | Uludag et al. |
| 2009/0016574 | A1 | 1/2009 | Tsukahara |
| 2009/0060286 | A1 | 3/2009 | Wheeler et al. |
| 2010/0014718 | A1 | 1/2010 | Savvides et al. |
| 2010/0141770 | A1 | 6/2010 | Gomi |
| 2010/0290703 | A1 | 11/2010 | Sim et al. |
| 2013/0322729 | A1 | 12/2013 | Mestha et al. |
| 2015/0035961 | A1 | 2/2015 | Chen et al. |
| 2016/0019420 | A1 | 1/2016 | Feng et al. |
| 2016/0019421 | A1 | 1/2016 | Feng et al. |
| 2017/0091550 | A1 | 3/2017 | Feng et al. |

FOREIGN PATENT DOCUMENTS

| | | | |
|---|---|---|---|
| CN | 102113026 | A | 6/2011 |
| EP | 1647936 | A1 | 4/2006 |
| JP | H01299488 | A | 12/1989 |
| JP | 2005502961 | A | 1/2005 |
| JP | 2005063256 | A | 3/2005 |
| JP | 2007527270 | A | 9/2007 |
| JP | 2010541046 | A | 12/2010 |
| JP | 2011243862 | A | 12/2011 |
| WO | WO-2001029769 | A2 | 4/2001 |
| WO | WO-2005008566 | A1 | 1/2005 |

OTHER PUBLICATIONS

Kanzawa et al., "Human Skin Detection by Visible and Near-Infrared Imaging", Jun. 13-15, 2011, 2011 APR Conference on Machine Vision Applications, pp. 505-506, sections 4.1 and 4.2.*
International Search Report and Written Opinion—PCT/US2013/046366—ISA/EPO—dated Sep. 26, 2013.
Pavlidis I et al: "The imaging issue in an automatic face/disguise detection system," Proceedings IEEE Workshop on Computer Vision beyond the Visible Spectrum: Methods and Applications, Feb. 16, 2000 (Feb. 16, 2000), pp. 15-24, XP001028282.
Klare, et al., "Heterogeneous Face Recognition: Matching NIR to Visible Light Images," 2010 20th International Conference on Pattern Recognition, ICPR, 2010, pp. 1513-1516.
Li, et al, "Live Face Detection Based on the Analysis of Fourier Spectra", Biometric Technology for Human Identification, Proceedings of SPIE, 2004, vol. 5404, pp. 296-303.
Mavadati, et al, "Fusion of visible and synthesised near infrared information for face authentication," Image Processing (ICIP), 2010 17th IEEE International Conference on pp. 3801-3804, Sep. 26-29, 2010.
Pan, et al, "Liveness Detection for Face Recognition", Recent Advances in Face Recognition, DELAC, et al (Ed.), 2008, ISBN: 978-953-7619-34-3, InTech.
Yi et al, "Face Matching from Near Infrared to Visual Light Images". In Proceedings of IAPR/IEEE International Conference on Biometrics, (ICB-2007). Seoul, Korea , Aug. 2007, pp. 523-530.
Fredembach et al., "Combining visible and near-infrared images for realistic skin smoothing". In Proc. IS&T/SID 17$^{th}$ Color Imaging Conference, (CIC), 2009, pp. 1-6.

Bodade R., et al., "Fake Iris Detection: A Holistic Approach", International Journal of Computer Applications, vol. 19, No. 2, Apr. 2011, pp. 1-7.
Boyce C., et al., "Multispectral Iris Analysis: A Preliminary Study", IEEE, Proceedings of the 2006 Conference on Computer Vision and Pattern Recognition Workshop, Jun. 2006, pp. 1-9.
Lee S.J., et al., "Robust Fake Iris Detection Based on Variation of the Reflectance Ratio between the Iris and the Sclera", IEEE, 2006 Biometrics Symposium: Special Session on Research at the Biometric Consortium Conference, 2006, pp. 1-6.
Lee S.J., et al., "Multifeature-based fake iris detection method," Optical Engineering, vol. 46 (12), Dec. 2007, pp. 127204-1 to 127204-10.
Ahonen T., et al., "Face Description with Local Binary Patterns: Applications to Face Recognition", Dec. 2006, IEEE Transactions on Pattern Analysis and machine Intelligence, vol. 28, No. 12, pp. 2037-2041.
Anderson R., et al., "The Optics of Human Skin," Journal of Investigative Dermatology, 1981, vol. 77, No. 1, pp. 13-19.
Van Den Bergh M., et al., "Combining RGB and ToF Cameras for Real-Time 3D Hand Gesture Interaction," 2011 IEEE Workshop on Applications of Computer Vision, Jan. 15, 2011, pp. 66-72, IEEE, XP031913555.
Bhokare R., et al., "Multispectral Palm Image Fusion: A Critical Review," International Journal of Advanced Research in Computer Engineering & Technology (IJARCET), Jun. 2013, vol. 2 No. 6, pp. 2159-2164.
Boreki G., et al., "Hand Geometry: A New Approach for Feature Extraction", 2005, 6 Pages.
Boyce C.K., "Multispectral iris recognition analysis: Techniques an evaluation", Thesis Submitted to the College of Engineering and Mineral Resources At West Virginia University in Partial Fulfillment of the Requirements for the Degree of Master of Science in Electrical Engineering, West Virginia University, Morgantown, Jan. 1, 2006 (Jan. 1, 2006), pp. 1-102, XP002593740.
Burge M.J., et al.,"Multispectral Iris Fusion and Cross-Spectrum Matching" In: "Handbook of Iris Recognition", Jan. 1, 2013 (Jan. 1, 2013), Springer-Verlag, Chapter 9; XP055208926, pp. 171-181.
Ferrer M.A., et al., "Wide band spectroscopic skin detection for contactless hand biometrics", IET Computer Vision, The Institution of Engineering and Technology, Michael Faraday House, Six Hills Way, Stevenage, Herts. SG1 2AY, UK, vol. 6, No. 5, Sep. 21, 2012 (Sep. 21, 2012), pp. 415-424, XP006040017, ISSN: 1751-9632, DOI: 10.1049/IET-CVI.2011.0062.
Fischler M. A., et al., "Random Sample Consensus: A Paradigm for Model Fitting with Applications to Image Analysis and Automated Cartography" Communications of the ACM, vol. 24 (6), pp. 381-395, Jun. 1981.
Heisele B. et al., "A Component-based Framework for Face Detection and Identification", International Journal of Computer Vision, Aug. 2007, vol. 74 No. 2, pp. 167-181.
Hollingsworth K.P., et al., "Image Averaging for Improved Iris Recognition", Jun. 2, 2009 (Jun. 2, 2009), Advances in Biometrics, Springer Berlin Heidelberg, Berlin, Heidelberg, pp. 1112-1121, XP019117900, ISBN: 978-3-642-01792-6 the whole document.
Jain A. K., et al., "A prototype hand geometry-based verification system", Contract, 1999, pp. 166-171.
Koblova E.V., et al., "Estimation of Melanin Content in Iris of Human Eye", Proceedings of SPIE, Apr. 18, 2005, XP55215478, vol. 5688, pp. 302-311, ISSN: 0277-786X, DOI:10.1117/12.593651.
Lowe D.G., "Distinctive Image Features from Scale-Invariant KeyPoints," International Journal of Computer Vision, 2004, vol. 60 (2), pp. 91-110.
Michael G. K. O., et al., "Automated Hand Geometry Verification System Base on Salient Points" International Symposium on Communications and Information Technologies, 2003, 4 Pages.
Michael G.K.O., et al., "A contactless biometric system using multiple hand features", Journal of Visual Communication and Image Representation, vol. 23, No. 7, Oct. 1, 2012 (Oct. 1, 2012), pp. 1068-1084, XP55149117, ISSN: 1047-3203, DOI:10.1016/j.jvcir.2012.07.004.

(56) References Cited

OTHER PUBLICATIONS

Myneni R. B., et al., "The interpretation of spectral vegetation indexes", IEEE Transactions on Geoscience and Remote Sensing, 1995, vol. 33, No. 2, pp. 481-486.
Némesin V., et al., "Gradual Iris Code Construction from Close-Up Eye Video", Sep. 4, 2012 (Sep. 4, 2012), Advanced Concepts for Intelligent Vision Systems, Springer Berlin Heidelberg, Berlin, Heidelberg, pp. 12-23, XP047016315, ISBN: 978-3-642-33139-8.
Nguyen K., et al., "Robust mean super-resolution for less cooperative NIR iris recognition at a distance and on the move", Proceedings of the 2010 Symposium on Information and Communication Technology, SOICT '10, Jan. 1, 2010 (Jan. 1, 2010), pp. 122-127, XP055208559, New York, New York, USA DOI: 10.1145/1852611.1852635 ISBN: 978-1-45-030105-3.
Nunez A.S., et al., "Detection of Human Skin in Near Infrared Hyperspectral Imagery", Geoscience and Remote Sensing Symposium, 2008. IGARSS 2008. IEEE International, IEEE, Piscataway, NJ, USA, Jul. 7, 2008, pp. II-621-II-624.
Nunez et al., "A Physical Model of Human Skin and Its Application for Search and Rescue," Doctoral Dissertation, Air Force Institute of Technology, Wright-Patterson AFB, Dec. 2009, pp. 205.
Ong M.G.K., et al., "A single-sensor hand geometry and palmprint verification system", Proceedings of the 2003 ACM SIGMM workshop on Biometrics methods and applications, Nov. 8, 2003, Berkley, California, pp. 100-106.<http: citation.cfm?id="982526&CFID=557191462&CFTOKEN=14813679" />.
Park J.H., et al., "Multispectral iris authentication system against counterfeit attack using gradient-based image fusion", Optical Engineering, Soc. of Photo-Optical Instrumentation Engineers, Bellingham, vol. 46, No. 11, Nov. 1, 2007 (Nov. 1, 2007), pp. 117003-1-117003-14, XP002593741, ISSN: 0091-3286, DOI: 10.1117/1.2802367 [retrieved on Nov. 16, 2007].
Park M.K., et al., "Super-resolution image reconstruction: A Technical Overview" IEEE Signal Processing Magazine, IEEE Service Center, Piscataway, NJ, US, vol. 20, No. 3, May 1, 2003 (May 1, 2003), pp. 21-36, XP011097476.
Shi W., et al., "SenGuard: Passive user identification on smartphones using multiple sensors", Proceedings of the 2011 IEEE 7th International Conference on Wireless and Mobile Computing, Networking and Communications, Oct. 10-12, 2011, pp. 141-148.
Suvonvorn N., et al., "Real-Time Face Detection/Identification for Surveillance System", International Conference on Electronic Design, 2008, pp. 1-5.
Tan T., et al., "Iris Recognition: Recent Progress and Remaining Challenges", Biometric Technology for Human Indentification. Orlando, FL, Apr. 12-13, 2004; [Proceedings of SPIE—The International Society for Optical Engineering], Bellingham, WA : SPIE, US, vol. 5404, Apr. 12, 2004 (Apr. 12, 2004), pp. 183-194, XP001509165, ISBN: 978-0-8194-5327-3.
Vogel A., et al., "Optical Properties of Human Sclera, and Their Consequences for Transscleral Laser Applications", Lasers in Surgery and Medicine, Jan. 1, 1991, XP055007203, vol. 11, No. 4, pp. 331-340, ISSN: 01 96-8092 , DOI :10.1092/Ism.1900110404.
Zhu J., et al., "SenSec: Mobile security through passive sensing", Proceedings of the 2013 International Conference on Computing, Networking and Communications (ICNC), Jan. 28-31, 2013, pp. 1128-1133; http:citation.cfm?id="2496650&CFID=557191462&CFTOKEN=14813679".
Conti M. et al., Mind how you answer me! (Transparently authenticating the user of a smartphone when answering or placing a call). Work, 2011, pp. 249-260.
He Y., et al., "Liveness iris Detection Method based on the Eye's Optical features", Proceedings of SPIE 7838, Optics and Photonics for Counterterrorism and Crime Fighting VI and Optical Materials in Defence Systems Technology VII, Oct. 2010, pp. 1-8.
SONY: "User's Guide," XC-E series, version 1.0, 1999, 39 pages.
Li Y-H., "Robust Long Range Iris Recognition from Video Using Super Resolution", Jan. 1, 2010, XP55307829, pp. 1-199.
Wikipedia—The free Encyclopedia, "Light", Jul. 9, 2014, 12 pages, XP055307506.
Aghili B., et al., "Personal Identification/Verification by Using Four Fingers," 3rd International Congress on Image and Signal Processing (CISP2010), IEEE, 2010, pp. 2619-2623.
Ferrer M.A., et al., "Hand-Shape Biometrics Combining the Visible and Short-Wave Infraed Bands," IEEE Transactions on Information Forensics and Security, IEEE, vol. 6 No. 4, Dec. 2011, pp. 1305-1314.

\* cited by examiner

SYSTEMS AND METHOD FOR FACIAL VERIFICATION

BACKGROUND OF THE INVENTION

Field of the Invention

The present disclosure relates to systems and methods for facial verification. In particular, the disclosure relates to systems and methods for detecting a human face and determining whether or not the detected human face is a live human face.

Description of the Related Art

Facial detection and/or verification systems can be useful in a variety of contexts, including, e.g., parental control applications, law enforcement, mobile banking, and security applications. Conventional automated facial detection systems can detect a human face in an image. However, these systems generally cannot determine whether the face detected in the image was captured from a live human face, or merely captured from a photograph or other reproduction of a human face.

For example, in some cases, the detected face can come from an artificial source, such as a face in a photograph, an image of a face on a display screen, a facial mask, a model reproduction of a face, a mannequin, or any other non-living face. A subject who wants to create fake identification documents, for example, can use a photograph of someone else's face, or a mask, to try to trick the facial detection system. Moreover, even for sophisticated systems that account for blinking and other types of facial motion, detecting a live face maybe thwarted by using a video stream of someone else's face instead of a live face.

SUMMARY OF THE INVENTION

In one implementation, a method for detecting a live human face in an image is disclosed. The method can include receiving multispectral image data that includes a human face, said multispectral image data comprising visible light image data and near-infrared (NIR) image data. The method can comprise processing the multispectral image data to detect the human face, and can further include associating the detected human face in the visible light image data with the detected human face in the NIR image data to determine whether the detected human face is a live human face.

In another implementation, an imaging system for detecting a live human face in an image is disclosed. The imaging system can include at least one image sensor configured to capture multispectral image data comprising visible light image data and near-infrared (NIR) image data, wherein the multispectral image data includes a human face. In addition, the imaging system can include a face detection module configured to analyze the multispectral image data to detect the human face. The imaging system can also include a skin verification module configured to analyze the multispectral image data of the detected face and determine whether the detected human face is a live human face.

In yet another implementation, an imaging system is disclosed. The imaging system can include means for receiving multispectral image data that includes a human face, said multispectral image data comprising visible light image data and near-infrared (NIR) image data. The system can further include means for processing the multispectral image data to detect the human face. In addition, the system can include means for associating the detected human face in the visible light image data with the detected human face in the NIR image data to determine whether the detected human face is a live human face.

In another implementation, a non-transitory computer-readable medium is disclosed. The non-transitory computer-readable medium can have stored thereon code that when executed performs a method. The method can comprise receiving multispectral image data that includes a human face, said multispectral image data comprising visible light image data and near-infrared (NIR) image data. The method can further comprise processing the multispectral image data to detect the human face. In addition, the method can include associating the detected human face in the visible light image data with the detected human face in the NIR image data to determine whether the detected human face is a live human face.

DETAILED DESCRIPTION

System Overview

Implementations disclosed herein provide systems, methods and apparatus for verifying a live human face with an electronic device having one or more imaging sensors. For example, in one embodiment, the system may include a visible light imaging sensor and an infrared light imaging sensor. During image capture, the system may detect whether the captured face is from a live person, in contrast to a photograph or video, by combining the information from both sensors. For example, at some wavelengths, the data from the infrared light imaging sensor may be used to determine if there is heat emanating from the captured face, while at other wavelengths, the data from the infrared imaging sensor may be used to capture detailed texture information from the face. In another embodiment, the system may determine if the pixels corresponding to the captured face are pixels from live skin, as described below. One skilled in the art will recognize that the disclosed embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination may correspond to a return of the function to the calling function or the main function, or a similar completion of a subroutine or like functionality.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 1:
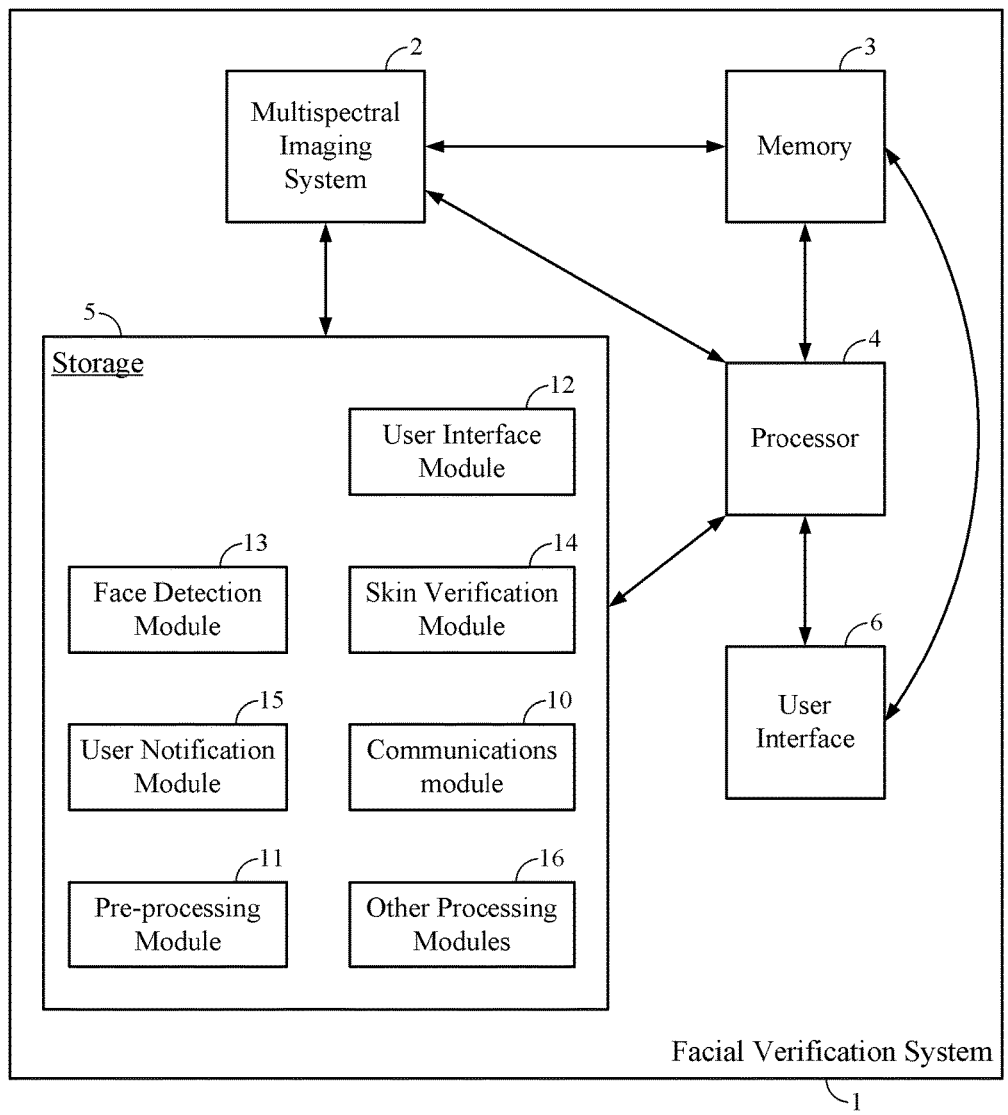
FIG. 1 is a schematic diagram of a facial verification system, according to one implementation.

FIG. 1 illustrates one implementation of a facial verification system 1 for verifying that an imaged human face is a live human face. The facial verification system 1 includes a multispectral imaging system 2. The multispectral imaging system 2 can be configured to include a multispectral imaging sensor that can sense a broad band of wavelengths, including at least visible light wavelengths and near infrared (NIR) light wavelengths. The multispectral imaging sensor can be configured to detect light at wavelengths between about 390 nm and about 1400 nm. Of course, the imaging sensor can also be configured to detect a much broader range of wavelengths as well. In some implementations, a charge-coupled device (CCD) can be used as the multispectral imaging sensor. In other implementations, a CMOS imaging sensor can be used as the multispectral imaging sensor.

In other implementations, the multispectral imaging system 2 can include two separate sensors instead of a multi-spectral imaging sensor. In this embodiment, the multispectral imaging system 2 could include a visible light sensor and a separate NIR sensor. For example, the multispectral imaging system 2 can include a first sensor such as a CCD/CMOS capable of detecting visible light at least in the range between about 390 nm and about 800 nm. The multispectral imaging system 2 can further include a second sensor, such as a CCD/CMOS that is capable of detecting NIR light in the range between about 800 nm and about 1400 nm. In some implementations, the wavelength ranges for the visible and NIR sensors can overlap or can even be substantially the same. For example, in various implementations, a MT9M112 sensor manufactured by Aptina Imaging (San Jose, Calif.) can be used as the visible light sensor, and a MT9M001 sensor manufactured by Aptina Imaging (San Jose, Calif.) can be used as the NIR sensor. Skilled artisans would understand that other types of sensors are possible. In some implementations, imaging filters, such as a NIR pass filter, can be used on a suitable CCD/CMOS to detect only the NIR data. Skilled artisans would understand that various other sensors or combinations thereof can be used to capture visible and NIR image data.

The facial verification system 1 can further include a memory 3 and a processor 4. The memory 3 and processor 4 are configured to electrically communicate with each other and with the multispectral imaging sensor 2. The facial verification system 1 also has a storage device 5 that is capable of storing various software modules that can be executed by the processor 3. In some implementations, the processor 4 can receive and transmit data to and from the multispectral imaging system 2, and can operate on that data by executing computer-implemented instructions stored in a software module in the storage device 5.

The storage device 5 can be any suitable computer-readable storage medium, such as a non-transitory storage medium. The storage device 5 can comprise any number of software modules. For example, a communications module 10 and a pre-processing module 11 can be stored on the storage device 5. The communications module 10 can comprise computer-implemented instructions that manage the flow of data between the components of the facial verification system 1. The pre-processing module 11 can be configured to pre-process data, such as image data received from the multispectral imaging system 2, before other operations are performed on the data. The storage device 5 can also include a user interface module 12. The user interface module 12 can comprise instructions for implementing a user interface 6. As will be discussed in more detail below with reference to FIGS. 7A-7B, a virtual box can be drawn around faces detected by the system for viewing by a user, and the percentage of pixels that have a higher probability of being live rather than non-live skin can be displayed on the user interface 6 in some implementations. Other user interface features, including a graphical user interface (GUI), can be controlled or implemented by instructions stored in the user interface module 12.

The storage device 5 further includes a face detection module 13. The face detection module 13 can include software that can detect a human face in an image. In some implementations, the face detection module 13 can use known techniques to detect and verify the geometry of a captured face in an image. In some implementations, the face detection module 13 can be configured to detect the outline of a face, while in other implementations, the face detection module 13 can detect the general region in which a face is located (e.g., a face located within a particular square or rectangular region). In one implementation, for example, the OKAO Vision Face Sensing Technology, manufactured by OMRON Corporation of Kyoto, Japan, can be used by the face detection module 13. Other implementations of the face detection module 13 are possible and thus embodiments are not limited to any particular method for detecting faces in an image.

A skin verification module 14 can also be stored in the storage device 5. As will be described in more detail herein, the skin verification module 14 can include computer-implemented instructions for verifying that skin in an image of a human face is live human skin, as opposed to non-live skin generated by an image captured from a photograph or other artificial human face. In some implementations, the skin verification module 14 can also verify that skin on other parts of a human body is live human skin. The storage device 5 also includes a user notification module 15. The user notification module 15 can be configured to notify a user that the detected face is a live or non-live human face. In some implementations, the user notification module 15 is able to notify the user which pixels were determined to be live or non-live skin pixels. Also, as shown in FIG. 1, other processing modules 16 can be stored in the storage device 5 as desired for implementing various other functionalities for the system 1.

The facial verification system 1 includes the user interface 6. The user interface 6 can enable a user of the system 1 to interact with the system and to effectively use the various modules to verify that an imaged face is a live human face in an image. For example, the user interface 6 can include one or more displays to display the captured image and/or other data related to the facial verification operation. The display(s) can also be configured to display a graphical user interface (GUI) to further enhance the usability of the system 1. The user interface 6 can include various audio devices, such as a microphone, speakers, or other devices configured to receive or transmit sound. In some implementations, the user interface 6 can include various peripheral devices, including, e.g., a keyboard, a mouse, a printer, and other input/output devices.

The facial verification system 1 can be implemented on a mobile device, including a mobile phone or smartphone, a tablet computer, a laptop computer, a digital camera, or the like. By integrating the multispectral imaging system 2, the memory 3, the processor 4, the storage 5, and the user interface 6 on a mobile device, the facial verification system 1 can advantageously be used without requiring the system to remain in a fixed location. In other implementations, however, the facial verification system 1 can comprise a desktop computer, server, computer workstation, or other type of computing device. The multispectral imaging system 2 can be integrated with the other computer hardware, or the multispectral imaging system 2 can be separate from the computing device, for example as a separate camera or cameras.

Multispectral Imaging Overview

Figure 2:
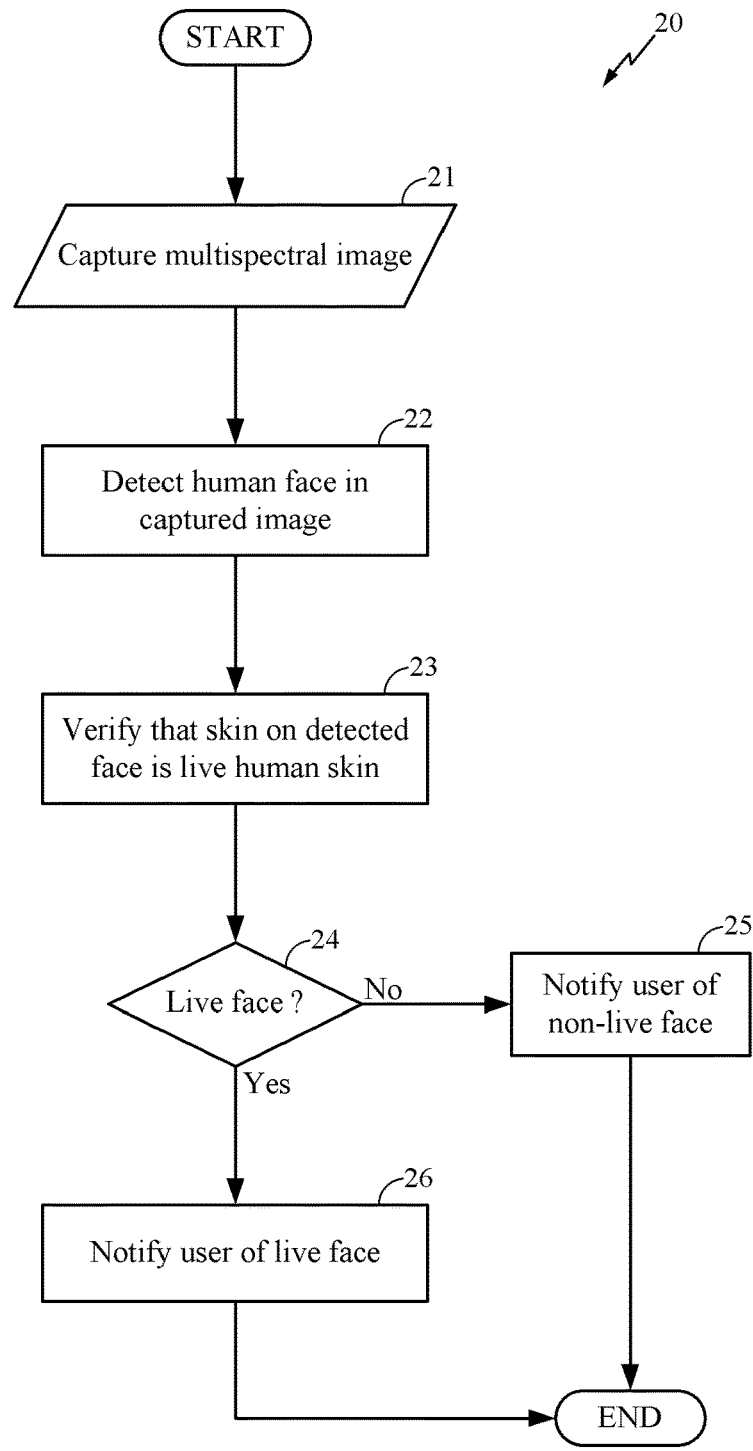
FIG. 2 is a flowchart illustrating one implementation of a method for verifying a live human face using multispectral imaging data.

FIG. 2 is a flowchart illustrating one implementation of a method 20 for verifying a live human face using multispectral imaging data. In block 21, multispectral image data is captured. The multispectral image data can comprise image data spanning at least the visible light and NIR spectra. For instance, the image data can be captured by the multispectral imaging system 2 over a wavelength range between about 390 nm and about 1400 nm. By utilizing image data spanning both the visible and NIR wavelengths, richer details of a scene or object can be sensed than if the image data were limited to a narrower spectrum of light. For example, NIR image data can yield smoother surfaces than corresponding visible light image data in some circumstances.

After the image is captured at block 21, the method 20 moves to a block 22, wherein a human face is detected in the captured image. Any suitable method of face detection can be used to detect the face in the image. For example, as described above, the face detection module 13 can detect details about the geometry of the captured face. Alternatively, the face detection module 13 can detect the general region in which a face lies, such as within a particular box in an image.

As explained above, however, face detection may not be able to determine whether or not the detected face is a live human face or an artificial reproduction of a face, such as an image captured from a photograph, a mask, a facial module or mold, or any other artificial human face. After detecting a face in block 22, the method 20 moves to a block 23 wherein the facial verification system 1 can verify that the skin on the detected face is live human skin. As discussed in more detail below, a variety of methods can be employed to verify that the skin is live skin.

The method 20 then moves to a decision block 24 to determine if the detected face is a live human face. There are various ways to determine if the detected face is a live human face. For example, as explained below with respect to FIG. 6F, the number of live and non-live skin pixels can be computed. If the number of live skin pixels exceeds a certain threshold number of pixels within the detected face, then it can be determined that the detected face is a live human face. In other embodiments, for each pixel, the probability that the pixel is a live skin pixel can be computed. The number of pixels in which it is more probable that the pixel is live skin than non-live skin can be computed to determine the number of live skin pixels. If there are more live skin pixels than non-live skin pixels (or another threshold), then it can be determined that the face is a live human face.

If a decision is made that the face is a live face, then the method 20 moves to a block 26 to notify the user that the face is live. If a decision is made that the face is not a live face, then the method 20 moves to a block 25 wherein the user is notified that the face is not a live human face. For example, the user notification module 15 can be implemented to notify the user that the face is a non-live face by way of, e.g., the user interface 6. As described below, given the image data for a set of pixels in the image, it can be determined whether or not the face as a whole is live or non-live. For example, the detected face could be an image of a reproduction of a human face, such as an image of another photograph. More details on how the system detects whether the face is live or not are described below.

Figure 3:
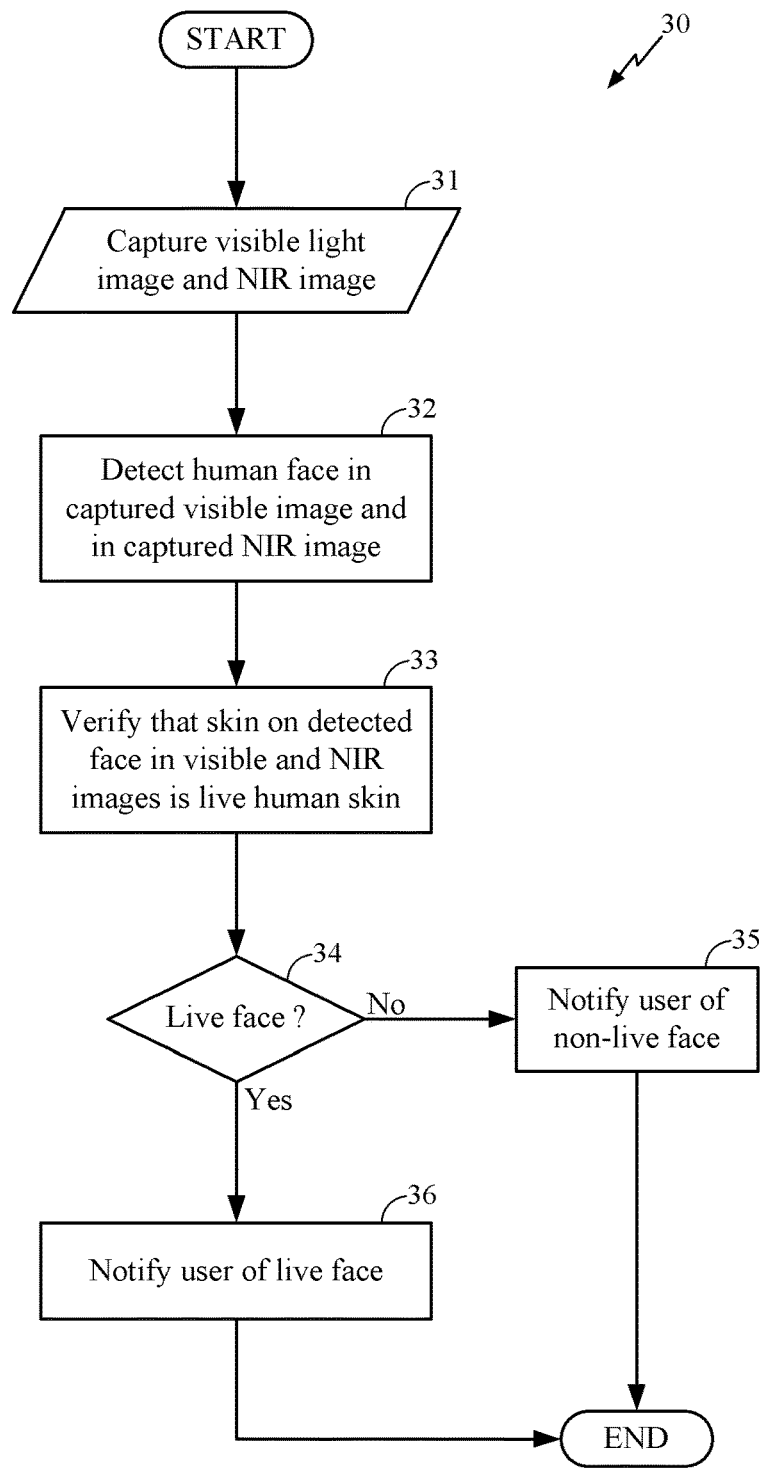
FIG. 3 is a flowchart illustrating another implementation of a method for verifying a live human face.

Turning to FIG. 3, another implementation of a method 30 for verifying a live human face is disclosed. Unlike in FIG. 2, however, in method 30 the NIR image data and visible light image data are captured separately, as opposed to with a single multispectral sensor. The method 30 starts and moves to a block 31, wherein a visible light image and a NIR image of a face to be analyzed are captured. As explained above with respect to FIG. 1, separate visible light and NIR sensors (e.g., CCDs or CMOSs) can capture two separate images that contain a human face.

The method 30 then moves to a block 32 wherein a human face is detected in both the visible light and NIR images. As above, any suitable face detection method can be implemented for both the visible light and NIR images. For example, the OKAO Vision Face Sensing Technology, manufactured by OMRON Corporation, can be used in some implementations to detect a face. The method 30 then moves to a block 33 wherein the system verifies that the skin on the detected face in both the visible light and NIR images is live human skin. Various systems and methods for verifying live skin are presented herein such as discussed with respect to FIGS. 6A-6C.

Once the skin is verified in block 33, the method 30 moves to decision block 34 to determine if the captured face is a live face. As described above with respect to FIG. 2, there are a variety of ways to determine if the detected face is a live human face. For example, as above, if the number of live skin pixels exceeds a certain threshold number of pixels within the detected face, then it can be determined that the detected face is a live human face. As in FIG. 2, if the detected face is not a live human face as determined in block 34, then the method 30 moves to a block 35 wherein the user is notified that the face is not live. If, however, a determination is made at the decision block 34 that the detected face is determined to be a live human face, then the method 30 moves to a block 36, and the user can be notified that the captured face is from a live human.

Figure 4:
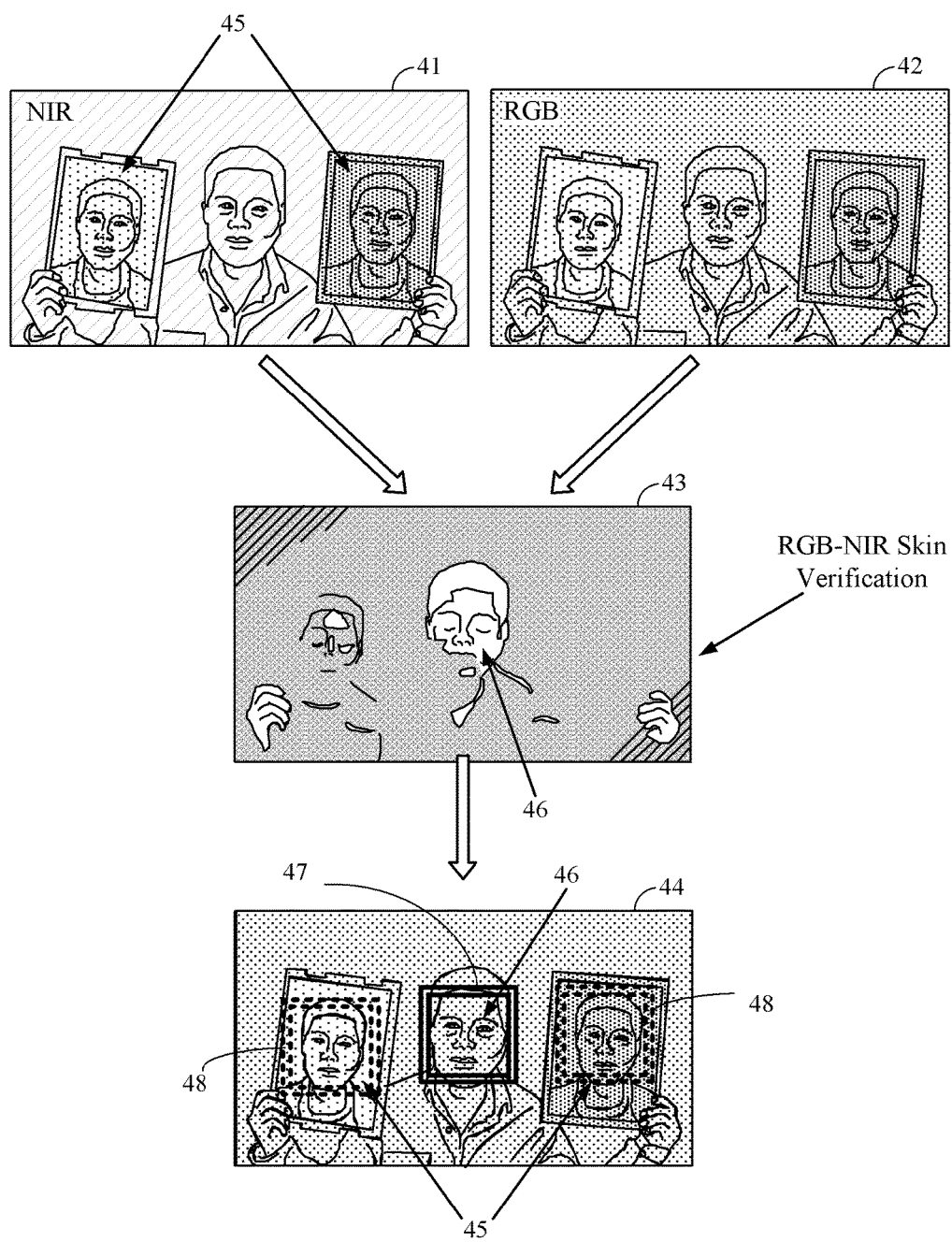
FIG. 4 illustrates experimental results from the method presented in FIG. 3.

FIG. 4 illustrates experimental results from the method presented in FIG. 3. As described with respect to block 31, a NIR image 41 is captured and a visible (e.g., RGB) image 42 is captured by separate NIR and visible light sensors, respectively. Alternatively, a multispectral sensor can be used, and the image data can be post-processed to separate the NIR image data from the visible light image data. In other implementations, filters can be applied over the sensors to filter the desired wavelengths.

In both the NIR and visible images 41, 42, one live human face 46 is presented, and two artificial human faces 45 are presented. The artificial human faces 45 are represented by photographs of a human face. For example, the artificial face can be represented by a color or black and white photographic print of a human face. Indeed, the facial verification system 1 can be effective at verifying live human faces in both color and black and white images or representations. It should be appreciated that other artificial representations of a human face are possible. A conventional face detection system may be able to detect all three human faces in the images 41, 42; yet the conventional system would not be able to detect that two of the three faces in the images 41, 42 are in fact artificial faces 45 instead of a live human face 46.

A skin verification image 43 of FIG. 4 illustrates the results after executing the skin verification method of block 33 of FIG. 3, which will be explained in more detail below in the discussion of FIGS. 6A-6C. As can be seen in the skin verification image 43, the live human face 46 has been accurately verified by the skin verification module 14, as shown by the high contrast between the live face 46 and the black background. The high contrast of the live face 46 in image 43 reflects the relatively high number of live skin pixels detected in the image 43. The artificial human faces 45 are illustrated as having lower contrast with the black background because there are fewer pixels determined to be live skin pixels.

In the final live face verification image 44 of FIG. 4, the live face 46 has been accurately detected, as shown by the solid lines of box 47 bounding the live face 46. On the other hand, the two non-live faces 45 have also been identified, as illustrated by the two boxes 48 having dashed lines that bound the non-live faces 45. Given the final image 44, the user can be accurately notified of whether (and which) detected human faces are indeed live human faces.

Overview—Verifying that Detected Face is Live Human Face

Figure 5:
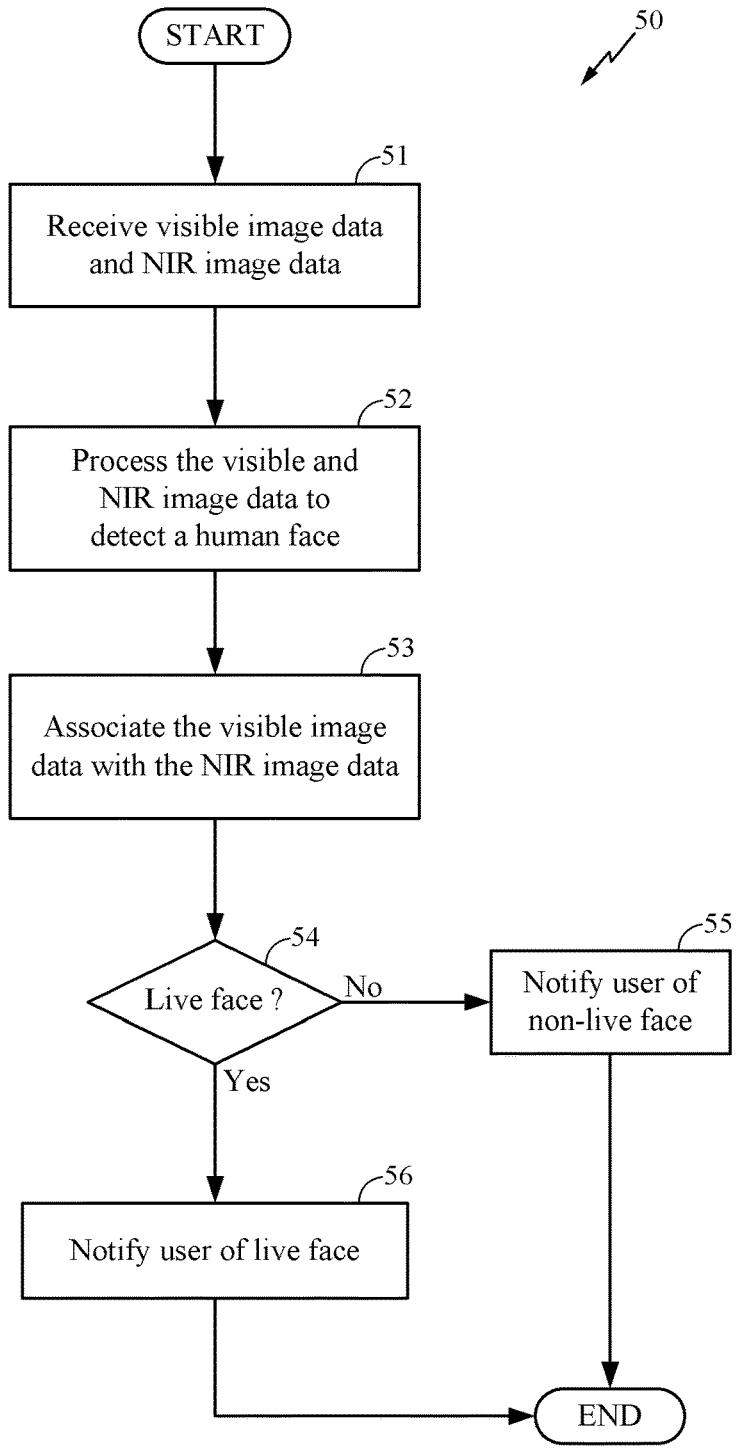
FIG. 5 is a flowchart illustrating one method for determining whether a captured human face is a live human face.

FIG. 5 is a flowchart illustrating one method 50 for determining whether a captured human face is a live human face. The method 50 begins in a block 51, wherein visible image data and NIR image data are received by the facial verification system 1. In some implementations, the communications module 10 and/or the processor 4 can receive images from the multispectral imaging system 2. The image data can be captured by the multispectral imaging system 2, or the data can be captured by an external imaging system and communicated to the processor 4 and/or communications module 10. As explained above, the NIR and visible image data can be captured by a single sensor or by separate sensors.

After the visible and NIR image data are received in block 51, the method 50 moves to a block 52 to process the visible and NIR image data to detect a human face. For example, the face detection module 13 can detect the human face in the image(s) using any suitable face detection method as explained above with respect to FIGS. 1-3. The method 50 then moves to a block 53, wherein the visible image data and the NIR image data are associated to determine whether the detected human face is a live human face. The association of the visible image data with the NIR image data can be applied to a single batch of multispectral image data or to separate visible and NIR images. The method 50 then moves to a decision block 54 to determine whether the detected face represents an artificial face. If a decision is made that the detected face is not a live human face, then the method 50 moves to a block 55 to notify the user that the face is a non-live face. If, however, a decision is made that the detected face is a live face, then method 50 moves to a block 56 to notify the user that the detected face is from a live human.

Identifying Live and Non-Live Skin Pixels

Figure 6A:
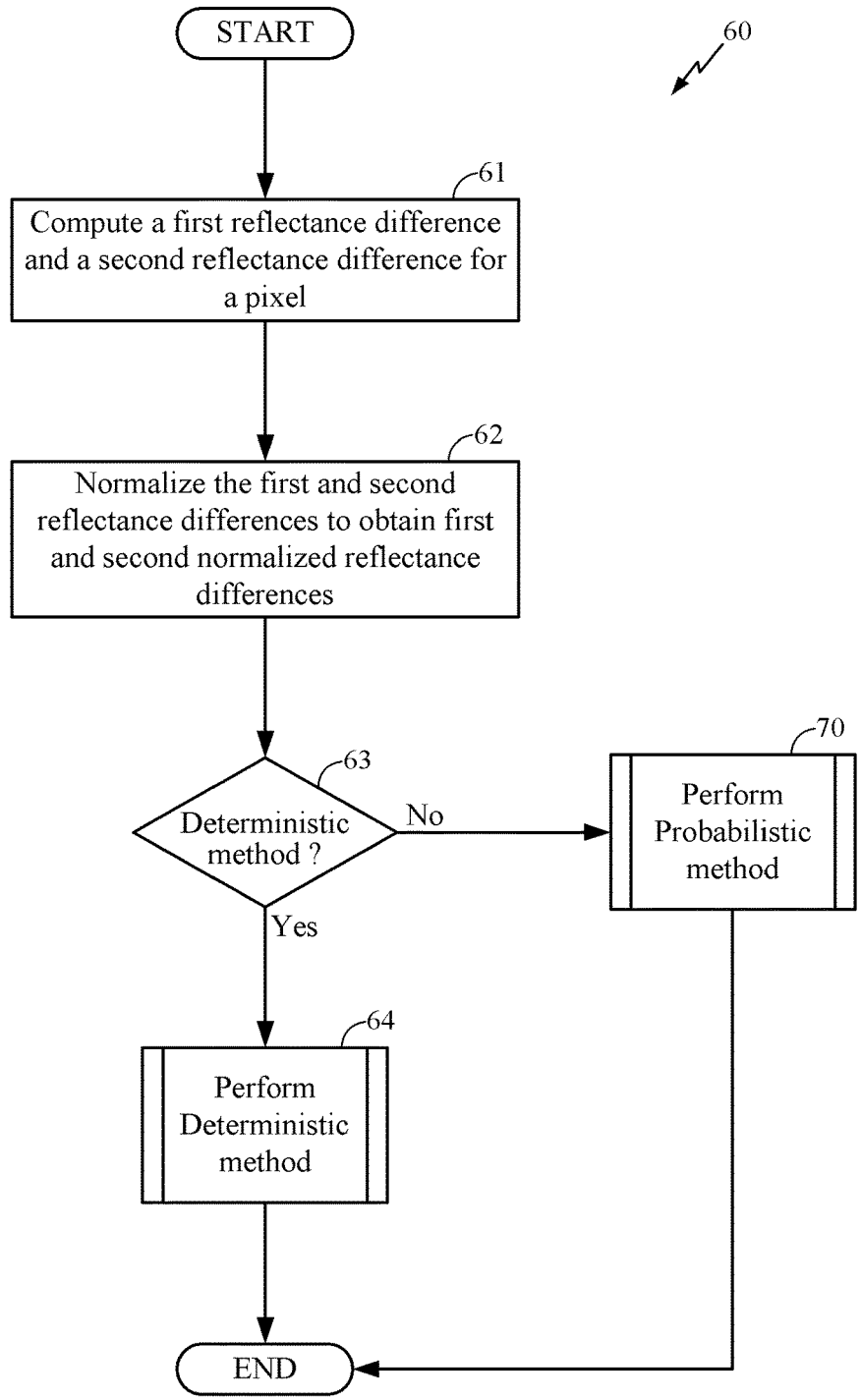
FIG. 6A is a flowchart illustrating a method for determining whether a pixel is representative of live or non-live human skin.
Figure 6B:
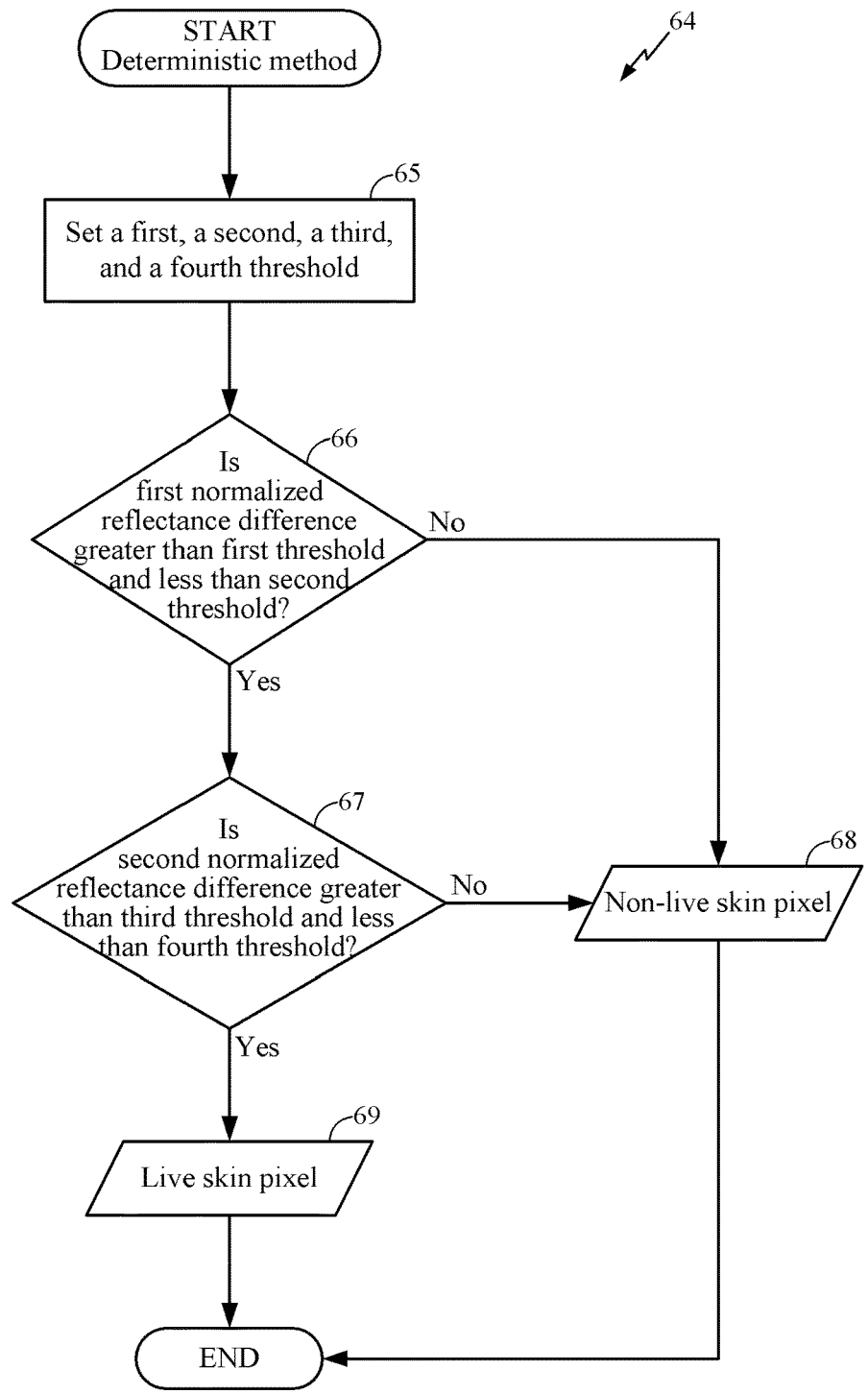
FIG. 6B is a flowchart illustrating a deterministic method, according to one implementation.
Figure 6C:
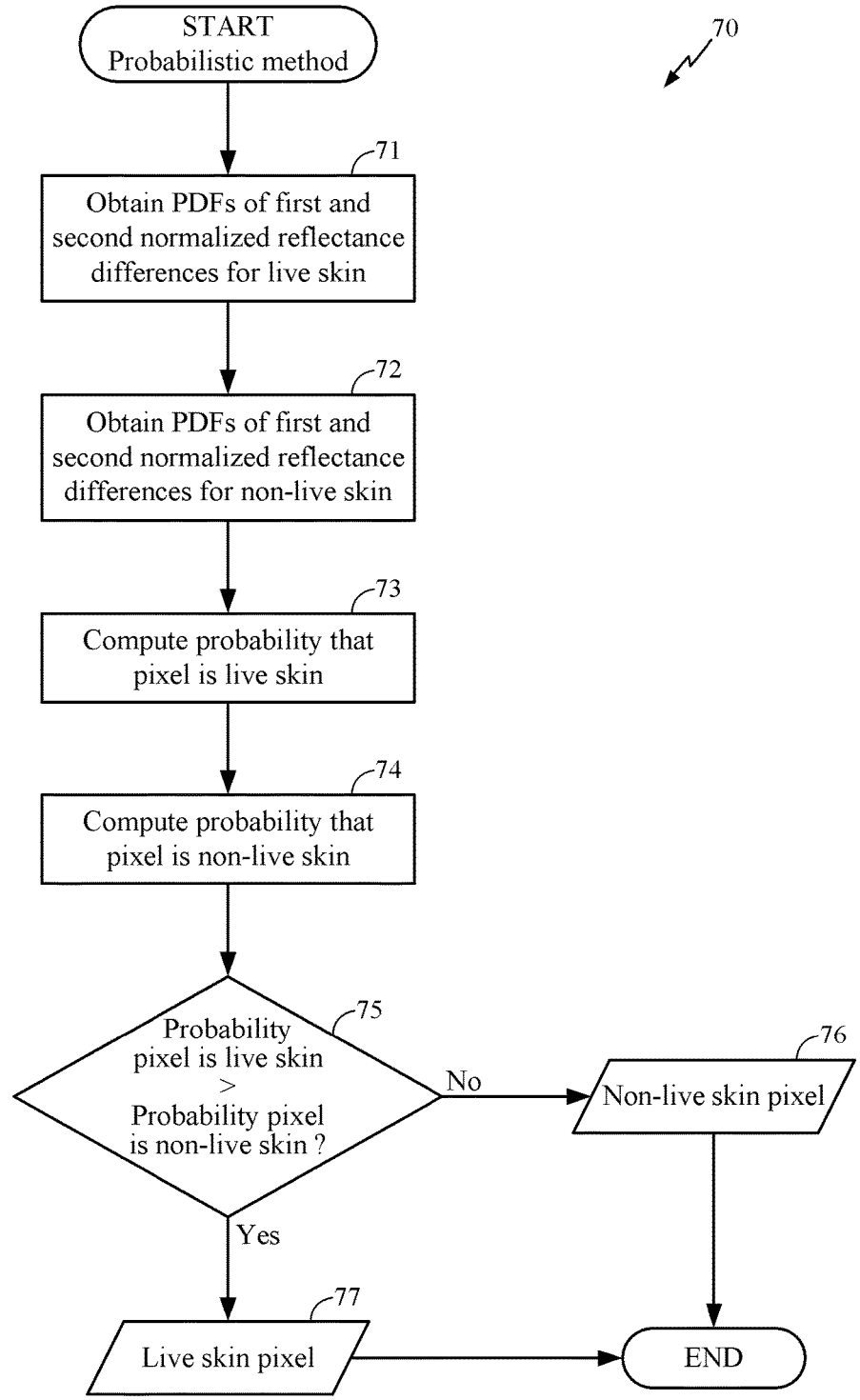
FIG. 6C is a flowchart illustrating a probabilistic method, according to another implementation.

FIGS. 6A-6C are flowcharts illustrating various implementations for identifying live and non-live skin pixels in a detected human face in multispectral image data. In some implementations, before the user is notified as to the determination of whether the detected face is a live human face, the skin verification module 14 can determine, on a pixel-by-pixel basis, which pixels represent live human skin and which pixels represent non-live human skin.

FIG. 6A is a flowchart of a method 60 for determining whether a particular pixel i in an image is representative of live or non-live human skin. The illustrated method 60 begins in a block 61, wherein a first reflectance difference, $v_1$, and a second reflectance difference, $v_2$, are calculated for a particular pixel i associated with both the NIR and the visible image data. The first reflectance difference, $v_1$, and the second reflectance difference, $v_2$, can be based in part on the reflectance value of human skin in both the visible and NIR spectra. According to one implementation, the first and second reflectance differences can be determined by $$v_1 = \rho_i(\lambda_{NIR}) - \rho_i(\lambda_g), \text{ and}$$

$$v_2 = \rho_i(\lambda_g) - \rho_i(\lambda_r)$$

where $\rho_i$ represents the reflectance value for the pixel i of the captured skin (whether live or non-live) at NIR wavelengths ($\lambda_{NIR}$), green wavelengths ($\lambda_g$), and red wavelengths ($\lambda_r$), respectively. In some implementations, the reflectance value $\rho_i$ can be modeled based upon the illumination, L, that impinges on a surface and the reflectance, R, of a particular material. In this case, the reflectance, R, for skin can be much stronger in the NIR spectrum than in the visible spectrum (and particularly stronger than the green wavelength band). Due to the disparity in reflectance between the NIR and green wavelengths, the green image data can be used in computing the reflectance differences in some implementations. However, note that since the calculation of $v_1$ and $v_2$ is proportional to the difference between the detected intensities at the indicated wavelengths, in practice, the raw pixel values for each wavelength can be used for each pixel i in computing the reflectance differences $v_1$ and $v_2$. Thus, the reflectance differences $v_1$ and $v_2$ can generally be proportional to the difference between the detected intensities of the imaged skin for NIR and green wavelengths, and for green and red wavelengths, respectively.

As shown in the above relationships for $v_1$ and $v_2$, the first reflectance difference, $v_1$, can be determined based upon the difference between the reflectance value (or raw pixel data) in a portion of the NIR image data, $\rho_i(\lambda_{NIR})$, and the reflectance value (or raw pixel data) of green data in a corresponding portion of the visible light image data, $\rho_i(\lambda_g)$.

In some implementations the portion of the NIR image data is a particular pixel or group of pixels, and the corresponding portion of the visible light image data is a corresponding pixel or group of pixels of the visible light image data. The second reflectance difference can be the difference between the reflectance value (or raw pixel data) of the green data and the reflectance value (or raw pixel data) of red data in the corresponding portion (e.g., pixel or group of pixels) of the visible light image data. Without being limited by theory, the green image data can be used to calculate the reflectance values and/or reflectance differences because, as explained above, the contrast between NIR data and green data can be greater than between the NIR data and other colors (e.g., blue or red). Of course, the reflectance values for other colors can be compared. For example, the red and blue reflectance values or the green and blue reflectance values can be compared in some implementations to calculate $v_2$ and After computing the first and second reflectance differences for a particular pixel, the method 60 moves to a block 62 of FIG. 6A, wherein the first and second reflectance differences, $v_1$ and $v_2$, are normalized to obtain first and second normalized reflectance differences, $r_1$ and $r_2$, respectively, given by $$r_1 = \frac{\rho_i(\lambda_{NIR}) - \rho_i(\lambda_g)}{\rho_i(\lambda_{NIR}) + \rho_i(\lambda_g)}, \text{ and}$$

$$r_2 = \frac{\rho_i(\lambda_g) - \rho_i(\lambda_r)}{\rho_i(\lambda_g) + \rho_i(\lambda_r)}.$$

Other ways of normalizing the reflectance differences are possible. In some implementations, normalization need not occur; instead, the raw pixel values can be used without normalization.

After normalization, the method 60 proceeds to a decision block 63 to determine whether a deterministic method is to be used. In some implementations, the skin verification module 14 can select a method for analyzing the detected skin. If, for example, a decision is made to select the deterministic method, then the method 60 moves to a block 64 to perform the deterministic method. If a decision is made to not select the deterministic method, then the method 60 moves to a block 70 to perform a probabilistic method. While the probabilistic method is illustrated in FIG. 6A, it should be appreciated that other methods can be used to analyze the detected skin.

Deterministic Method

FIG. 6B is a flowchart illustrating one implementation of the deterministic method 64. The method 64 begins in block 65, wherein a first threshold $t_{n1}$, a second threshold $t_{n2}$, a third threshold $t_{r1}$, and a fourth threshold $t_{r2}$ are set or otherwise determined. In some implementations, the thresholds can be determined experimentally using empirical methods to obtain the best results. In other implementations, the thresholds can be estimated based on theoretical reflectance values for live and non-live human skin. In yet other implementations, the thresholds can be determined in real-time based on the properties of the image and/or the imaging device or system.

After setting the thresholds in block 65, the method 64 proceeds to a decision block 66 to compare the first and second thresholds with the first normalized reflectance difference. If a decision is made that the first reflectance difference is not greater than the first threshold and less than the second threshold, then the process proceeds to block 68 to return a non-live skin pixel to the user. If a decision is made that the first normalized reflectance difference, $r_1$ is greater than the first threshold, $t_{n1}$, but less than the second threshold, $t_{n2}$, then the process proceeds to another decision block 67 to compare the third and fourth thresholds with the second normalized reflectance difference.

Turning to block 67, if a decision is made that the second normalized reflectance difference, $r_2$, is greater than the third threshold, $t_{r1}$, but less than the fourth threshold, $t_{r2}$, then the method 64 proceeds to block 69 to return a live skin pixel. If a decision is made that the second normalized reflectance difference is not greater than the third threshold and less than the fourth threshold, then the method 64 moves to block 68 to return a non-live skin pixel.

Thus, as disclosed in FIG. 6B, in order to identify a live skin pixel, the normalized reflectance differences satisfy both $$t_{n1} < r_1 < t_{n2} \text{ and } t_{r1} < r_2 < t_{r2}.$$

In other implementations, one set of thresholds may be weighted more heavily than the others. For example, in some implementations, if only one of the threshold inequalities (e.g., only one of decision blocks 66 and 67) is satisfied, then the method can nevertheless return a live skin pixel in block 69. The thresholds implemented in the deterministic method can be based on pre-calibrated, experimental data, in which various thresholds are applied under various lighting conditions. The facial verification system 1 can thereby utilize the rich information provided by the NIR and visible image data in determining whether a particular pixel is representative of live or non-live human skin. Indeed, the experimental results presented in FIG. 4 above illustrate an example implementation of the deterministic method disclosed in FIGS. 6A-6B.

Probabilistic Method

Turning to FIG. 6C, an example implementation of the probabilistic method 70 is illustrated. In general, a probabilistic method can estimate the likelihood that a given pixel displays live human skin based at least in part on image data that captures known live skin over a large number of samples. For example, one or more known, live human faces can be imaged in various lighting conditions, and the reflectance values and/or raw pixel data for the known live skin regions can be stored. Similarly, known, artificial skin such as a photograph can be imaged in similar lighting conditions over a large number of samples, and the reflectance values and/or raw pixel data can be stored. The facial verification system 1 can use this stored library of known live and non-live skin image data to estimate the probability that any given pixel in an image displays live or non-live skin.

The method 70 illustrated in FIG. 6C starts in a block 71, wherein probability density functions (PDFs) for the first and second normalized reflectance differences $r_1$ and $r_2$, respectively, are obtained for live human skin. The PDFs can be calculated based upon experimental data under various, predetermined lighting conditions. For example, a large sample of data can be collected based upon different types of live skin, each sample imaged under different lighting conditions ranging from dim to bright. A sufficiently large number of images and/or pixels are captured by the multi-spectral imaging system 2, which can be performed while the system is offline, e.g., not being employed to verify a live face.

Let $(r_{1,1}, r_{1,2}, \ldots r_{1,M})$ denote a set of $r_1$ (e.g., first normalized reflectance differences) that are calculated or derived from M live skin pixels. Many different images can be captured to obtain the set of M pixels. The M live skin pixels are known to represent live skin because a live subject is intentionally imaged in order to calculate the PDF for $r_1$. This set of known live skin image data can then be used to estimate the probability that any given pixel represents live skin. Given the set of M live pixels, the PDF, $f^T(r_1)$, for live skin pixels (represented by the superscript T) can be derived by $$f^T(r_1) = \frac{1}{M}\sum_{i=1}^{M} K_h(r_1 - r_{1,i}) = \frac{1}{Mh}\sum_{i=1}^{M} K\left(\frac{r_1 - r_{1,i}}{h}\right),$$

where K(.) is the kernel, a symmetric function that integrates to one, and h is a positive smoothing parameter. Any suitable kernel K(.) can be used. In some implementations, for example, a normal distribution is assumed, in which case the Gaussian kernel can be implemented. For the Gaussian kernel, an optimal choice for h can be given by $$h = \left(\frac{4\sigma^5}{3M}\right)^{\frac{1}{5}},$$

where $\sigma$ is the standard deviation.

Similarly, the PDF of $r_2$ for live skin can be given by $$f^T(r_2) = \frac{1}{M}\sum_{i=1}^{M} K_h(r_2 - r_{2,i}) = \frac{1}{Mh}\sum_{i=1}^{M} K\left(\frac{r_2 - r_{2,i}}{h}\right),$$

After obtaining the PDFs of the first and second normalized reflectance differences for live skin, the method 70 moves to a block 72, wherein the PDFs $f^F(r_1)$ and $f^F(r_2)$ of the normalized reflectance differences $r_1$ and $r_2$ for non-live skin (represented by the superscript F) are similarly obtained using experimental image data of non-live skin. For example, a sample of pixels representing fake skin can be obtained using one or more images of a photograph or model of a human face to obtain the PDF.

Figure 6D:
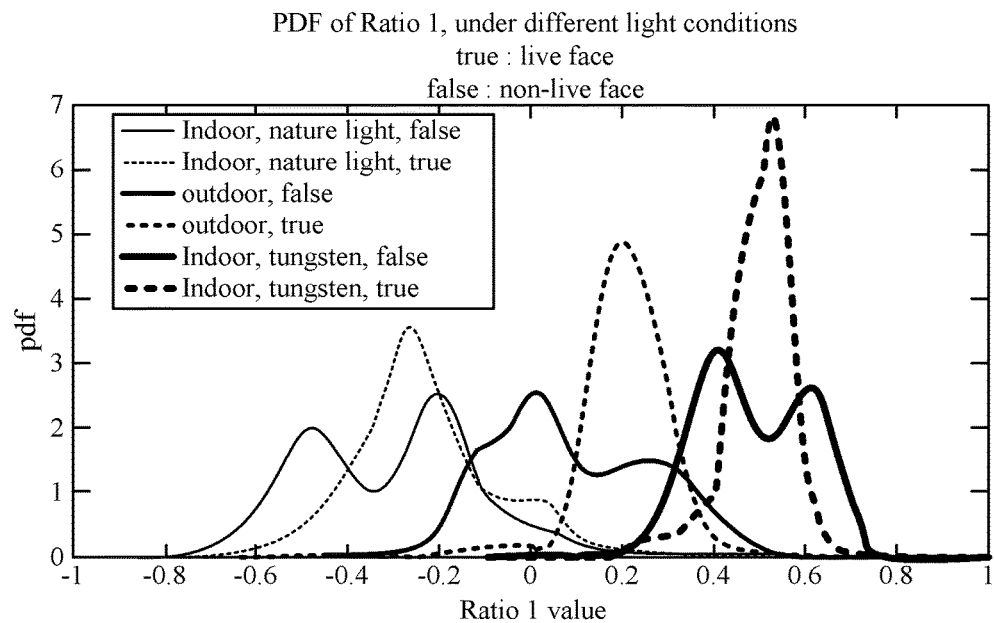
FIGS. 6D and 6E are graphs of experimental results for derived probability density functions.
Figure 6E:
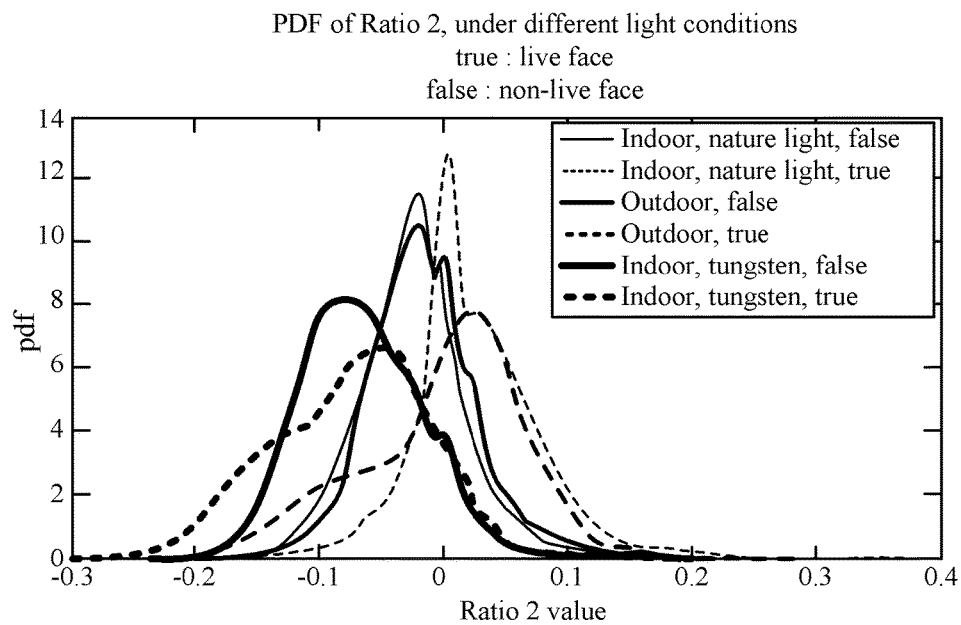

FIG. 6D is a graph of the PDF for $r_1$ under various lighting conditions for live skin pixels and non-live skin pixels. FIG. 6E is a graph of the PDF for $r_2$ under various lighting conditions for live skin pixels and non-live skin pixels. The obtained PDFs of the normalized reflectance values for both live and non-live skin pixels can be saved as a look-up table (LUT) in some implementations for easy access by the skin verification module 14. In other implementations, the PDFs can be estimated as a parameterized function.

Given the above relationships, if it is known that a pixel j is a live skin pixel, then the probabilities of $r_1$ and $r_2$, respectively, are $$p_j(a \leq r_1 \leq b \mid \text{live\_skin\_j}) = \int_a^b f^T(r_1) dr_1, \text{ and}$$

$$p_j(a \leq r_2 \leq b \mid \text{live\_skin\_j}) = \int_a^b f^T(r_2) dr_2.$$

Similar calculations can be performed to determine the probabilities of $r_1$ and $r_2$, if it is instead known that the pixel j is a non-live skin pixel.

The method 70 then moves to a block 73, wherein the probability that a particular pixel is a live skin pixel is computed. Once a PDF for a normalized reflectance difference is obtained for a particular device or type of device (and potentially under certain lighting conditions), this information can be used in future images captured on the device(s) to estimate the probability that any particular pixel contains live skin in any subsequent images. Thus, the PDFs obtained above, which can be obtained offline in some implementations, can be used in an online mode to determine in real-time whether a particular pixel is a live or non-live skin pixel.

For example, the probability of any pixel i to be a live skin pixel can be calculated by $$p_i^T = p(\text{live\_skin\_i} \mid r_1, r_2) = \frac{p(r_1, r_2 \mid \text{live\_skin\_i})p(\text{live\_skin})}{p(r_1, r_2)}.$$

According to the Bayesian rule, $p(r_1, r_2 \mid \text{live\_skin\_i}) = p(r_2 \mid r_1, \text{live\_skin\_i}) p(r_1 \mid \text{live\_skin\_i}).$ If it is assumed that $r_1$ and $r_2$ are independent variables, then $$p_i^T = \frac{p(r_2 \mid \text{live\_skin\_i})p(r_1 \mid \text{live\_skin\_i})p(\text{live\_skin})}{p(r_1, r_2)}.$$

Moreover, if there is no prior knowledge that the pixel i is live or non-live, then the probability that any particular pixel i is a live skin pixel can be estimated by $p_i^T \propto p(r_2 \mid \text{live\_skin\_i}) p(r_1 \mid \text{live\_skin\_i}).$ The method 70 can move to a block 74 to similarly compute the probability that the particular pixel is a non-live skin pixel. The probability that a pixel i is a non-live skin pixel can be determined by $p_i^F \propto p(r_2 \mid \text{non-live\_skin\_i}) p(r_1 \mid \text{non-live\_skin\_i}).$ Although the two expressions for $p_i^T$ and $p_i^F$ are expressed in terms of proportionality, the relative values for these probabilities can be used to determine whether or not pixel i is a live or non-live skin pixel.

After computing the probabilities that the pixel is a live or non-live skin pixel, the method 70 proceeds to a decision block 75 to compare the probability that the pixel displays live skin with the probability that the pixel displays non-live skin. If a decision is made that the probability that the pixel is live skin is greater than the probability that the pixel is non-live skin, then the method 70 moves to a block 77 to indicate that the pixel is a live skin pixel. On the other hand, if a decision is made that the probability that the pixel is non-live skin is greater than the probability that the pixel is live skin, then the method 70 moves to a block 76 to indicate that the pixel is a non-live skin pixel. Thus, a particular pixel i can be identified as a live skin pixel if $p_i^T > p_i^F.$ Other methods for estimating the probability that a pixel is live or non-live skin are possible. For example, in various implementations, a probability threshold can be employed to determine whether or not the pixel is a live or non-live skin pixel. Moreover, while the above deterministic and probabilistic methods can be implemented on a pixel-by-pixel basis, exact alignment of the visible and NIR images and/or image data is not required, because facial skin can have a smooth color response. The above methods can therefore be effective if the visible and NIR facial images are only roughly aligned based on the face detection.

Identifying a Live Human Face

The implementations of FIGS. 6A-6C can be used to identify live or non-live skin pixels. In some implementations, this information can be presented to the user on a display (see, e.g., FIG. 4), and can be sufficient for the user to visually determine whether or not a detected face is a live human face. In other implementations, however, further processing can be performed to analyze the identified pixels to determine whether the detected face is a live face.

Figure 6F:
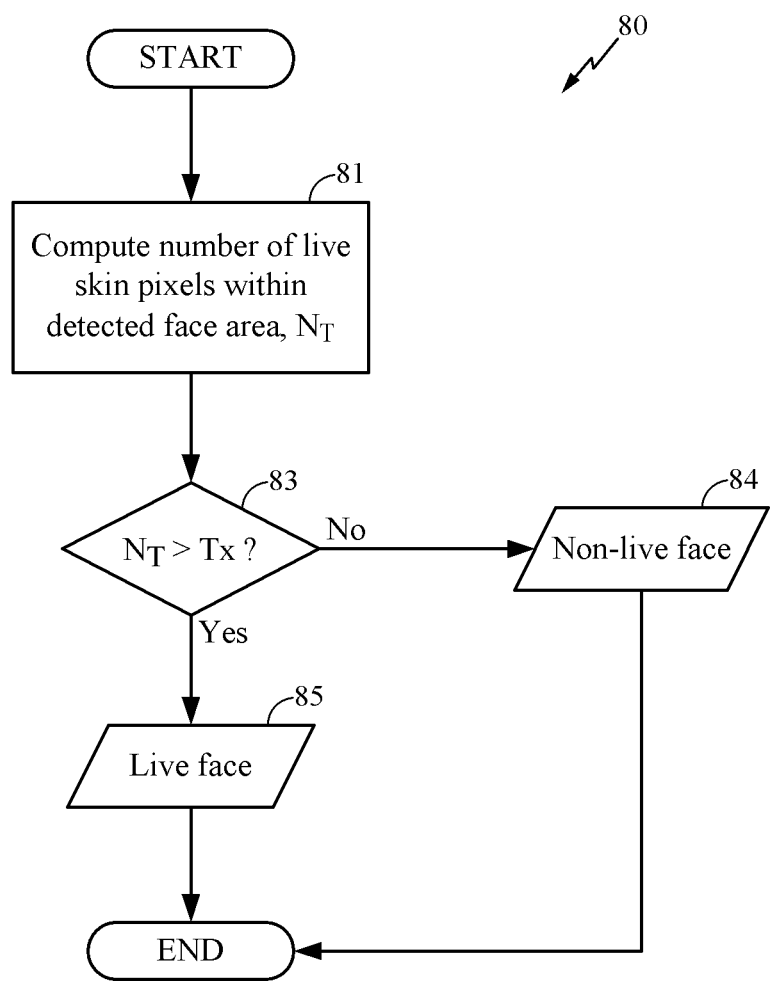
FIG. 6F is a flowchart illustration one method for determining whether a face is a live human face.

In FIG. 6F, one method 80 for identifying a live human face is disclosed. The method 80 starts in a block 81, wherein the number of live pixels within the detected face area, $N_T$, is computed. Upon computing the number of live skin pixels, the method 80 proceeds to a decision block 83. If a decision is made that the number of live pixels, $N_T$, exceeds a threshold number of pixels, $T_x$, then the method 80 moves to a block 85 to notify the user that the detected face is a live face. If a decision is made that $N_T$ is less than $T_x$, then the method 80 moves to a block 84 to notify the user that the detected face is not a live human face. Various thresholds $T_x$ can be used. For example, in some implementations, $T_x$ can be a particular percentage of pixels within the detected face, e.g., above about 50% in some implementations. In various implementations, the threshold $T_x$ can be about 50%, 60%, 70%, 80%, 90%, or any other suitable threshold percentage of pixels. In other implementations, various other thresholds can be used. For example, the number of non-live skin pixels within the detected face area, $N_F$, can be computed. If $N_T > N_F$, then the user can be notified that the detected face is a live face. Otherwise, the user can be notified that the detected face is not a live face.

Figure 7A:
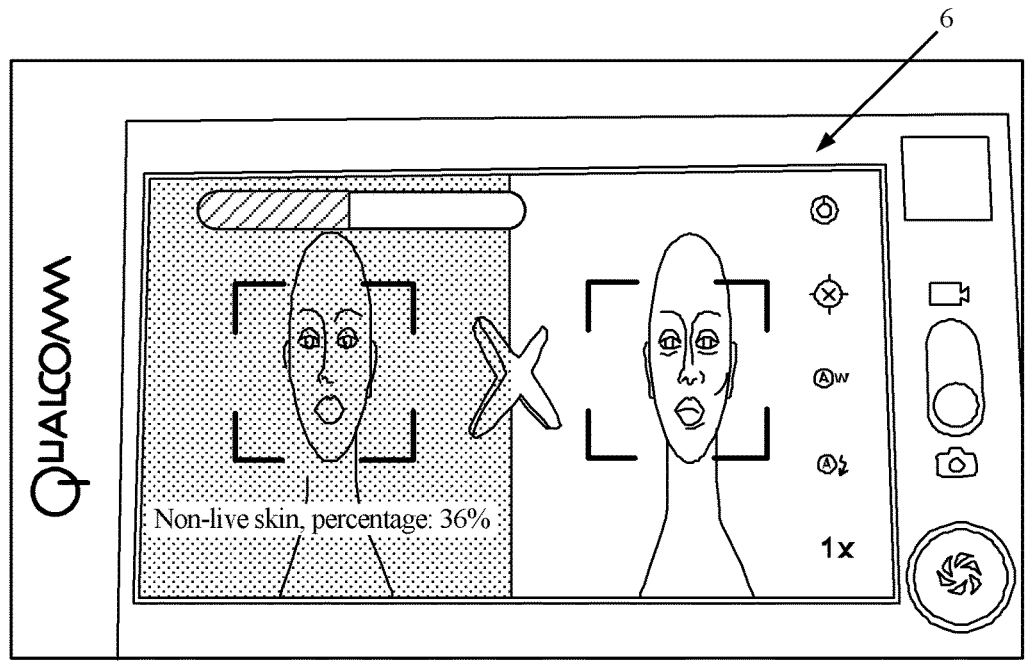
FIGS. 7A-7B are images of a user interface, according to various implementations.

FIG. 7A illustrates an example implementation of the user interface 6 when a non-live face is detected. In FIG. 7A, for example, an artificial model of a human face (e.g., a mannequin) is imaged using separate NIR (left image) and visible light (right image) sensors. The boxes on the left and right images can be used to illustrate the face detected by the face detection module 13. After identifying the live skin pixels, the user interface 6 of FIG. 7A indicates that only 36% of pixels have a higher probability of being a live skin pixel than a non-live skin pixel, and 64% of pixels have higher probability of being a non-live skin pixel than a live skin pixel. For the illustrated implementation, because there are fewer live skin pixels than non-live skin pixels (e.g., the number of live skin pixels is less than 50% of the total pixels within the detected face), the user notification module 15 can notify the user via the user interface 6 that the detected face is not a live human face (denoted by an "X" across the center of the display).

Figure 7B:
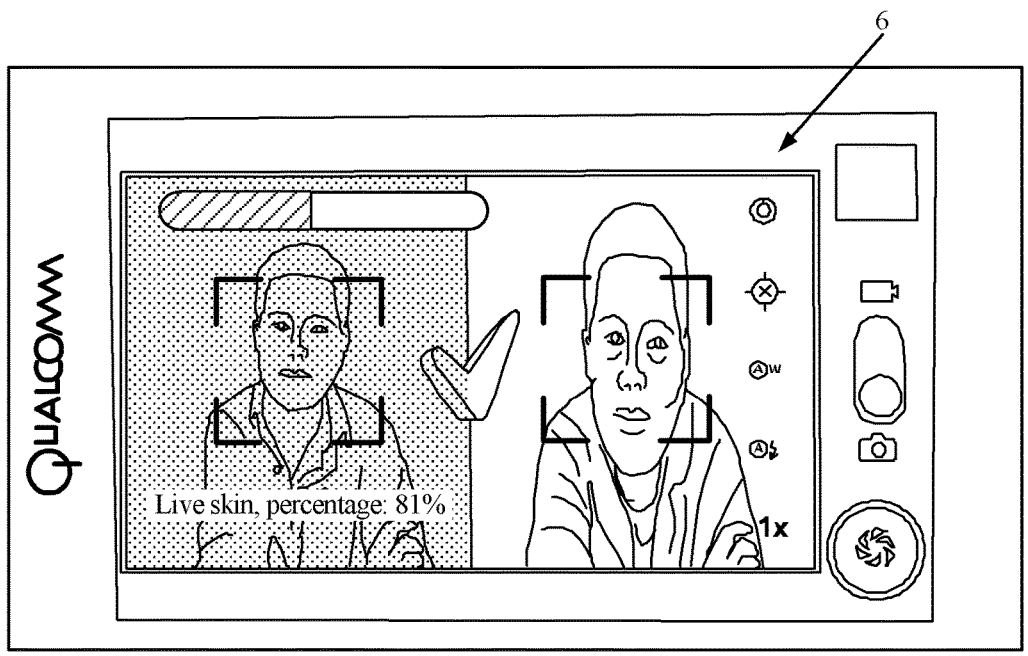

On the other hand, FIG. 7B illustrates an example implementation of the user interface 6 when a live face is detected. In FIG. 7B, however, 81% of the pixels have a higher probability of being a live skin pixel than a non-live skin pixel. Therefore, the user notification module 15 can notify the user that the detected face is a live human face (denoted by a check mark in the center of the display in FIG. 7B).

Other Implementations

Figure 8A:
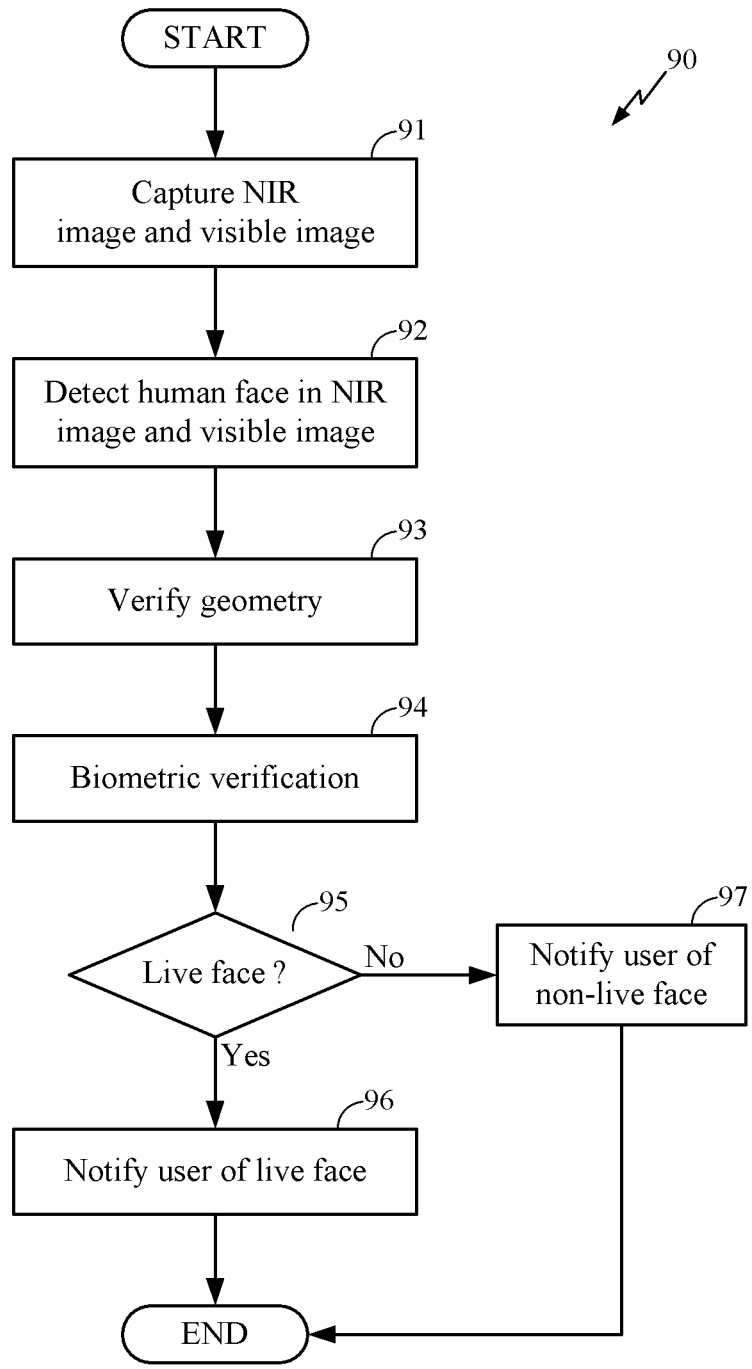
FIGS. 8A-8B are flowcharts illustrating various other implementations for verifying a live human face.

Other implementations of the facial verification system 1 are possible. One method 90 is shown in FIG. 8A. As shown in FIG. 8A, the method 90 begins in a block 91 to capture a NIR image and a visible image. As above, once the NIR and visible images are captured, the method 90 moves to a block 92, wherein a human face is detected in the NIR image and the visible image. The method 90 then moves to a block 93 to verify the geometry detected for the face using any suitable method. After verifying the facial geometry, the method 90 proceeds to a block 94, wherein the detected face is then biometrically verified. While image data of live and non-live skin has been used in various disclosed implementations herein, it should be appreciated that various other methods for confirming that a face is a live face can be performed. For example, iris recognition or retinal scans can be used in some implementations. In other implementations, the subject's veins and arteries underlying the skin can be imaged to determine whether the detected face is a live face. Additionally, known facial movements or tics can be imaged in some implementations. In still other implementations, a heat signature can be used as a biometric verification method. As above, the method 90 proceeds to a decision block 95 to determine if the detected face is a live human face. If a decision is made that the detected face is a live face, then the method 90 moves to a block 96 to notify the user of a detected, live face. Otherwise, if a decision is made that the detected face is not a live face, then the method 90 moves to a block 97 to notify the user that the face is a non-live face.

Figure 8B:
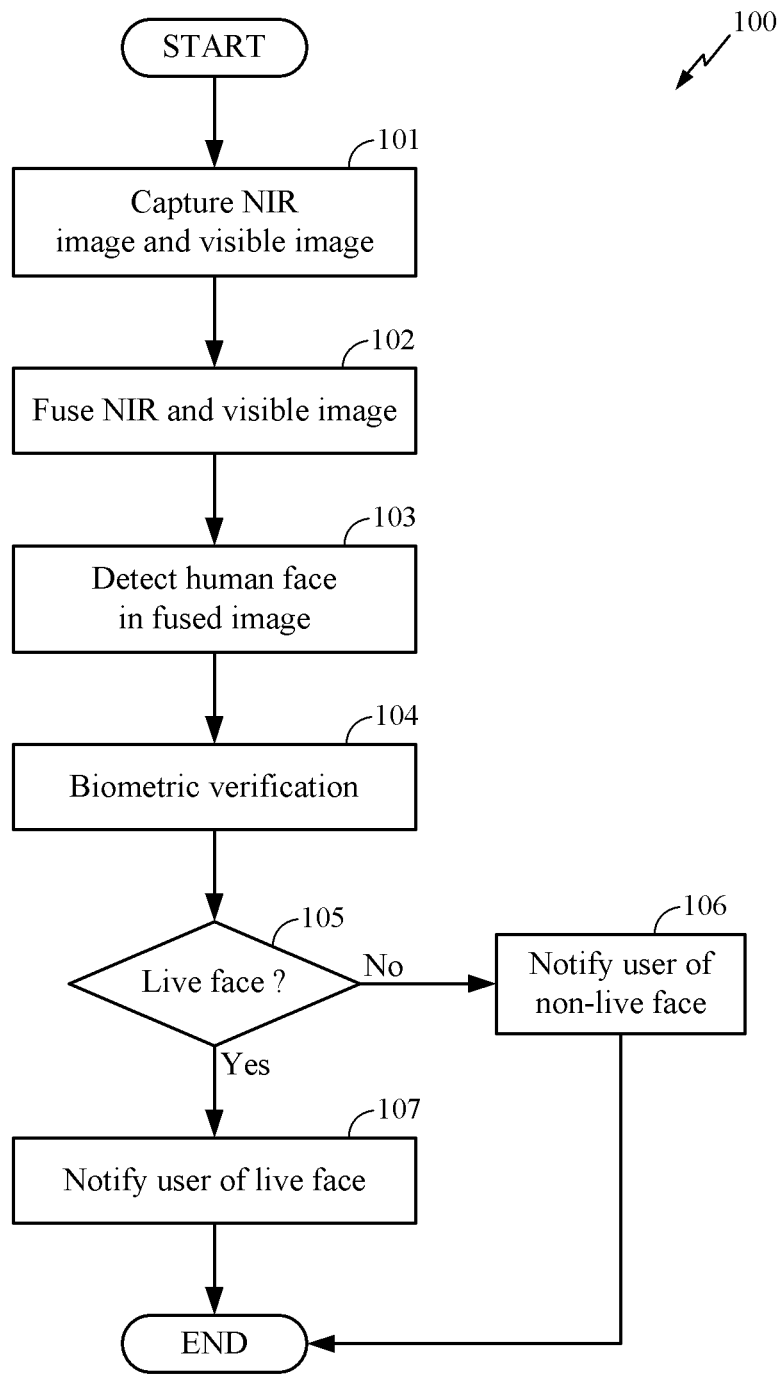

Turning to FIG. 8B, another method 100 for verifying a live face is disclosed. The method 100 starts in a block 101 to capture a NIR and a visible image. After capturing the images, the method 100 proceeds to a block 102, wherein the NIR and visible image data are fused together using any known fusing algorithm. As above, the method 100 moves to a block 103 to detect a human face in the fused image. As described with respect to FIG. 8A, the illustrated method 100 proceeds to a block 104 to perform one or more biometric verification processes on the detected human face in the fused image. The method 100 then moves to a decision block 105. If a decision is made that the detected face is a live face, then the method 100 proceeds to a block 107 to notify the user that the face is a live face. Otherwise, if a decision is made that the detected face is not a live face, then the method 100 proceeds to a block 106 to notify the user that the face is not a live face.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for detecting a live human face in an image, comprising:
    receiving multispectral image data that includes a human face, said multispectral image data comprising visible light image data and near-infrared (NIR) image data;
    processing the multispectral image data to detect the human face;
    associating the detected human face in the visible light image data with the detected human face in the NIR image data; and
    determining whether the detected human face is a live human face based at least in part on a first reflectance difference and a second reflectance difference, wherein the first reflectance difference is the difference between a reflectance value in a portion of the detected human face in the NIR image data and a reflectance value of a first color in the portion of the detected human face in the visible light image data, and wherein the second reflectance difference is the difference between the reflectance value of the first color and a reflectance value of a second color in the portion of the detected human face in the visible light image data.

2. The method of claim 1, wherein determining whether the detected human face is a live human face comprises:
    normalizing the first reflectance difference to obtain a first normalized reflectance difference; and
    normalizing the second reflectance difference to obtain a second normalized reflectance difference.

3. The method of claim 2, wherein determining whether the detected human face is a live human face further comprises:
    comparing the first normalized reflectance difference with a first threshold and a second threshold; and
    comparing the second normalized reflectance difference with a third threshold and a fourth threshold.

4. The method of claim 3, wherein determining whether the detected human face is a live human face comprises determining whether the NIR image data and the visible light image data for the portion of the detected human face contain image data representative of live human skin based at least in part on whether the first normalized reflectance difference is greater than the first threshold and less than the second threshold, and based at least in part on whether the second normalized reflectance difference is greater than the third threshold and less than the fourth threshold.

5. The method of claim 4, wherein determining whether the detected human face is a live human face is based at least in part on the number of pixels in the detected face that contain image data representative of live human skin.

6. The method of claim 2, wherein the first color is substantially green, and wherein the second color is substantially red.

7. The method of claim 2, further comprising obtaining a first probability density function of the first normalized reflectance difference and a second probability density function of the second normalized reflectance difference, wherein said first and second probability density functions are based at least in part on image data of live human skin.

8. The method of claim 7, further comprising calculating a first probability that the NIR image data and the visible light image data for the portion of the detected human face contain image data representative of live human skin,
    said first probability based at least in part on the first probability density function and the second probability density function.

9. The method of claim 8, further comprising:
    obtaining a third probability density function of the first normalized reflectance difference and a fourth probability density function of the second normalized reflectance difference, wherein said third and fourth probability density functions are based at least in part on image data that is not representative of live human skin,
    calculating a second probability that the NIR image data and the visible light image data for the portion of the detected human face contain image data not representative of live human skin,
    said second probability based at least in part on the third probability density function and the fourth probability density function.

10. The method of claim 9, further comprising comparing the first probability and the second probability to determine whether the NIR image data and the visible light image data for the portion of the detected human face contain image data representative of live human skin.

11. The method of claim 10, wherein determining whether the detected human face is a live human face is based at least in part on the number of pixels in the detected face that contain image data representative of live human skin.

12. The method of claim 1, further comprising capturing multispectral image data with an imaging apparatus.

13. The method of claim 12, wherein capturing multispectral image data comprises capturing a visible light image and a NIR image.

14. The method of claim 13, wherein processing the multispectral image data comprises:
processing the visible light image to detect the human face; and
processing the NIR image to detect the human face.

15. An imaging system for detecting a live human face in an image, the system comprising:
at least one image sensor configured to capture multispectral image data comprising visible light image data and near-infrared (NIR) image data, wherein the multispectral image data includes a human face;
a face detection module configured to analyze the multispectral image data to detect the human face; and
a skin verification module configured to analyze the multispectral image data of the detected human face and determine whether the detected human face is a live human face based at least in part on a first reflectance difference and a second reflectance difference, wherein the first reflectance difference is the difference between a reflectance value in a portion of the detected human face in the NIR image data and a reflectance value of a first color in the portion of the detected human face in the visible light image data, and wherein the second reflectance difference is the difference between the reflectance value of the first color and a reflectance value of a second color in the portion of the detected human face in the visible light image data.

16. The imaging system of claim 15, wherein the at least one image sensor comprises a NIR imaging sensor and a visible light sensor.

17. The imaging system of claim 15, wherein the skin verification module is further configured to:
normalize the first reflectance difference to obtain a first normalized reflectance difference; and
normalize the second reflectance difference to obtain a second normalized reflectance difference.

18. The imaging system of claim 17, wherein the skin verification module is further configured to:
compare the first normalized reflectance difference with a first threshold and a second threshold; and
compare the second normalized reflectance difference with a third threshold and a fourth threshold.

19. The imaging system of claim 18, wherein the skin verification module is further configured to determine whether the detected human face is a live human face based at least in part on whether the first normalized reflectance difference is greater than the first threshold and less than the second threshold, and based at least in part on whether the second normalized reflectance difference is greater than the third threshold and less than the fourth threshold.

20. The imaging system of claim 19, wherein the skin verification module is further configured to determine whether the detected human face is a live human face based at least in part on the number of pixels in the detected face that contain image data representative of live human skin.

21. The imaging system of claim 17, wherein the skin verification module is further configured to obtain a first probability density function of the first normalized reflectance difference and a second probability density function of the second normalized reflectance difference, wherein said first and second probability density functions are based at least in part on image data of live human skin.

22. The imaging system of claim 21, wherein the skin verification module is further configured to:
calculate a first probability that the NIR image data and the visible light image data for the portion of the detected human face contain image data representative of live human skin,
said first probability based at least in part on the first probability density function and the second probability density function.

23. The imaging system of claim 22, wherein the skin verification module is further configured to:
obtain a third probability density function of the first normalized reflectance difference and a fourth probability density function of the second normalized reflectance difference, wherein said third and fourth probability density functions are based at least in part on image data that is not representative of live human skin,
calculate a second probability that the NIR image data and the visible light image data for the portion of the detected human face contain image data not representative of live human skin,
said second probability based at least in part on the third probability density function and the fourth probability density function.

24. The imaging system of claim 15, further comprising a communications module configured to receive multispectral image data.

25. The imaging system of claim 15, further comprising a user notification module configured to notify the user whether or not the detected face is a live human face.

26. The imaging system of claim 15, further comprising a memory configured to store at least one of computer-readable instructions and image data.

27. An imaging system, comprising:
means for receiving multispectral image data that includes a human face, said multispectral image data comprising visible light image data and near-infrared (NIR) image data;
means for processing the multispectral image data to detect the human face;
means for associating the detected human face in the visible light image data with the detected human face in the NIR image data; and
means for determining whether the detected human face is a live human face based at least in part on a first reflectance difference and a second reflectance difference, wherein the first reflectance difference is the difference between a reflectance value in a portion of the detected human face in the NIR image data and a reflectance value of a first color in the portion of the detected human face in the visible light image data, and wherein the second reflectance difference is the difference between the reflectance value of the first color and a reflectance value of a second color in the portion of the detected human face in the visible light image data.

28. The imaging system of claim 27, wherein the means for receiving multispectral image data comprises a communications module.

29. The imaging system of claim 27, wherein the means for processing the multispectral image data comprises a face detection module.

30. The imaging system of claim 27, wherein the means for determining whether the detected human face is a live human face comprises a skin verification module.

31. The imaging system of claim 27, further comprising means for capturing multispectral image data.

32. The imaging system of claim 31, wherein the means for capturing multispectral image data comprises a NIR imaging sensor and a visible light sensor.

33. A non-transitory computer-readable medium having stored thereon code that when executed performs a method comprising:

receiving multispectral image data that includes a human face, said multispectral image data comprising visible light image data and near-infrared (NIR) image data;

processing the multispectral image data to detect the human face;

associating the detected human face in the visible light image data with the detected human face in the NIR image data; and determining whether the detected human face is a live human face based at least in part on a first reflectance difference and a second reflectance difference, wherein the first reflectance difference is the difference between a reflectance value in a portion of the detected human face in the NIR image data and a reflectance value of a first color in the portion of the detected human face in the visible light image data, and wherein the second reflectance difference is the difference between the reflectance value of the first color and a reflectance value of a second color in the portion of the detected human face in the visible light image data.

34. A method for detecting a live human face in an image, comprising:

receiving multispectral image data that includes a human face, said multispectral image data comprising visible light image data and near-infrared (NIR) image data;

processing the multispectral image data to detect the human face;

associating the detected human face in the visible light image data with the detected human face in the NIR image data; and determining whether the detected human face is a live human face based at least in part on a first normalized reflectance difference and a second normalized reflectance difference, wherein the first normalized reflectance difference is the difference between a reflectance value in a portion of the detected human face in the NIR image data and a reflectance value of a first color in the portion of the detected human face in the visible light image data, and wherein the second normalized reflectance difference is the difference between the reflectance value of the first color and a reflectance value of a second color in the portion of the detected human face in the visible light image data, wherein the determination of whether the detected human face is a live human comprises determining whether a portion of the NIR image data and the portion of the visible light image data contain image data representative of live human skin based at least in part on (i) whether the first normalized reflectance difference is greater than a first threshold and less than a second threshold and (ii) whether the second normalized reflectance difference is greater than a third threshold and less than a fourth threshold.

* * * * *